(12) United States Patent
Shannon

(10) Patent No.: US 11,073,192 B1
(45) Date of Patent: Jul. 27, 2021

(54) ASYMMETRICALLY-SHAPED ISOLATOR

(71) Applicant: United Launch Alliance, L.L.C., Centennial, CO (US)

(72) Inventor: Ryan Lee Shannon, Castle Rock, CO (US)

(73) Assignee: United Launch Alliance, L.L.C., Englewood, CO (US)

( * ) Notice: Subject to any disclaimer, the term of this patent is extended or adjusted under 35 U.S.C. 154(b) by 0 days.

(21) Appl. No.: 16/799,620

(22) Filed: Feb. 24, 2020

Related U.S. Application Data

(63) Continuation of application No. 15/636,139, filed on Jun. 28, 2017, now Pat. No. 10,570,984.

(51) Int. Cl.
| | |
|---|---|
| *F16F 15/08* | (2006.01) |
| *H01B 17/56* | (2006.01) |
| *B64G 1/22* | (2006.01) |
| *F16F 1/36* | (2006.01) |
| *F16F 1/373* | (2006.01) |

(52) U.S. Cl.
CPC ............ *F16F 15/08* (2013.01); *B64G 1/22* (2013.01); *F16F 1/36* (2013.01); *F16F 1/373* (2013.01); *H01B 17/56* (2013.01); *B64G 2001/228* (2013.01); *F16F 2222/02* (2013.01); *F16F 2222/04* (2013.01); *F16F 2226/04* (2013.01); *F16F 2234/00* (2013.01)

(58) Field of Classification Search
CPC .... F16F 15/08; F16F 1/36; F16F 1/373; F16F 1/371; F16F 2226/04; F16F 2234/00; F16F 1/366; B64G 1/22; B64G 2001/228; B21F 35/003; B60G 11/32; B60G 11/34
See application file for complete search history.

(56) References Cited

U.S. PATENT DOCUMENTS

| | | |
|---|---|---|
| 166,780 A | 8/1875 | Jeffrey |
| 224,937 A | 2/1880 | Mintzer |
| 319,049 A | 6/1885 | Armstrong |

(Continued)

FOREIGN PATENT DOCUMENTS

| | | |
|---|---|---|
| EP | 1666760 | 6/2006 |
| EP | 2639476 | 9/2013 |

(Continued)

OTHER PUBLICATIONS

Hu et al. "A combined dynamic analysis method for geometrically nonlinear vibration isolators with elastic rings," Mechanical Systems and Signal Processing, vol. 76-77, Aug. 2016, pp. 634-648. Abstract only.

(Continued)

*Primary Examiner* — Melanie Torres Williams
(74) *Attorney, Agent, or Firm* — Sheridan Ross P.C.

(57) ABSTRACT

Embodiments of the present invention generally relate to a novel system, device, and methods for providing an isolator for components and instrumentation to isolate vibrations, shock, static or quasi-static loads, thermal loads, and electrical currents. The novel isolator has an asymmetrical shape, experiences uniform motion under quasi-static loading, and reduces the effective modal mass across a range of frequencies. The novel isolator outperforms conventional vibration isolators in terms of cost, schedule (manufacturing time and lead time), heat dissipation, and performance.

20 Claims, 14 Drawing Sheets

(56) References Cited

U.S. PATENT DOCUMENTS

| | | | |
|---|---|---|---|
| 325,033 | A | 8/1885 | Wetmore |
| 475,633 | A | 5/1892 | Sweetland |
| 543,038 | A | 7/1895 | Messmer |
| 1,173,850 | A | 2/1916 | Oliver |
| 1,683,332 | A * | 9/1928 | Chilton ............... B60G 11/42 267/30 |
| 1,735,899 | A * | 11/1929 | Henry ................. F16F 1/371 267/30 |
| 2,594,665 | A | 4/1952 | Lockwood |
| 2,913,240 | A | 11/1959 | Mohr |
| 2,965,349 | A * | 12/1960 | Hutton ................ F16F 3/093 267/140.13 |
| 3,204,913 | A | 9/1965 | Lawrence et al. |
| 3,270,998 | A | 9/1966 | Keetch |
| 3,322,379 | A | 5/1967 | Flannelly |
| 3,450,379 | A | 6/1969 | Nolan |
| 4,586,689 | A | 5/1986 | Lantero |
| 4,932,637 | A | 6/1990 | Jarret |
| 4,942,075 | A | 7/1990 | Hartel et al. |
| 4,991,827 | A | 2/1991 | Taylor |
| 5,102,107 | A * | 4/1992 | Simon ................. F16F 1/377 267/152 |
| 5,499,790 | A | 3/1996 | Hay |
| 5,549,285 | A | 8/1996 | Collins |
| 5,897,093 | A | 4/1999 | Le Derf |
| 6,002,588 | A | 12/1999 | Vos et al. |
| 6,012,680 | A | 1/2000 | Edberg et al. |
| 6,135,390 | A | 10/2000 | Sciulli et al. |
| 6,244,579 | B1 | 6/2001 | Latvis, Jr. |
| 6,299,150 | B1 | 10/2001 | Allen et al. |
| 6,406,011 | B1 | 6/2002 | Kosar et al. |
| 6,427,990 | B1 * | 8/2002 | Hartmann ........... A47C 23/002 267/103 |
| 6,629,688 | B1 | 10/2003 | Sebert |
| 7,214,179 | B2 | 5/2007 | Miller, III et al. |
| 7,249,756 | B1 | 7/2007 | Wilke et al. |
| 7,303,185 | B2 | 12/2007 | Sebert |
| 8,262,068 | B1 | 9/2012 | Monson et al. |
| 8,613,431 | B1 | 12/2013 | Deloy et al. |
| 8,640,593 | B2 | 2/2014 | Hazan |
| 8,973,937 | B2 | 3/2015 | Williams |
| 9,360,075 | B2 | 6/2016 | Johnson et al. |
| 10,570,984 | B1 | 2/2020 | Shannon |
| 2005/0049721 | A1 | 3/2005 | Sulprizio |
| 2015/0083456 | A1 | 3/2015 | Chen et al. |
| 2015/0097085 | A1 | 4/2015 | Holemans |
| 2016/0123422 | A1 | 5/2016 | Keinanen et al. |

FOREIGN PATENT DOCUMENTS

| | | |
|---|---|---|
| FR | 1448534 | 1/1966 |
| KR | 2013-0030522 | 3/2013 |
| KR | 2013-0046029 | 5/2013 |
| SU | 1395867 | 5/1988 |
| WO | WO 2013/153173 | 10/2013 |

OTHER PUBLICATIONS

Official Action for U.S. Appl. No. 15/636,139, dated Aug. 27, 2018, 12 pages.

Official Action for U.S. Appl. No. 15/636,139, dated Feb. 12, 2019, 13 pages.

Official Action for U.S. Appl. No. 15/636,139, dated Jul. 8, 2019, 8 pages.

Notice of Allowance for U.S. Appl. No. 15/636,139, dated Oct. 21, 2019, 6 pages.

* cited by examiner

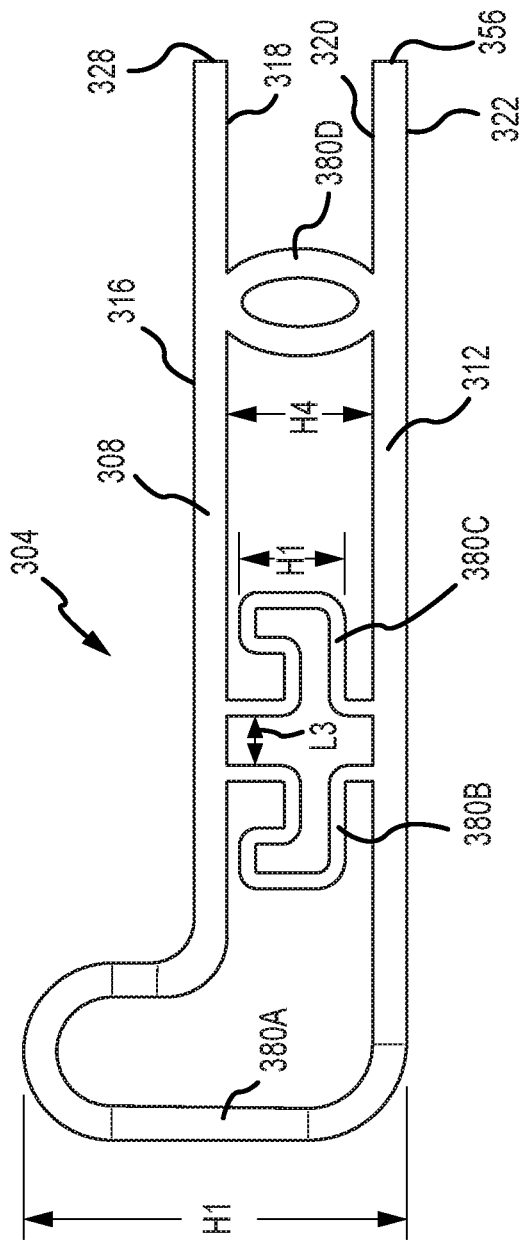
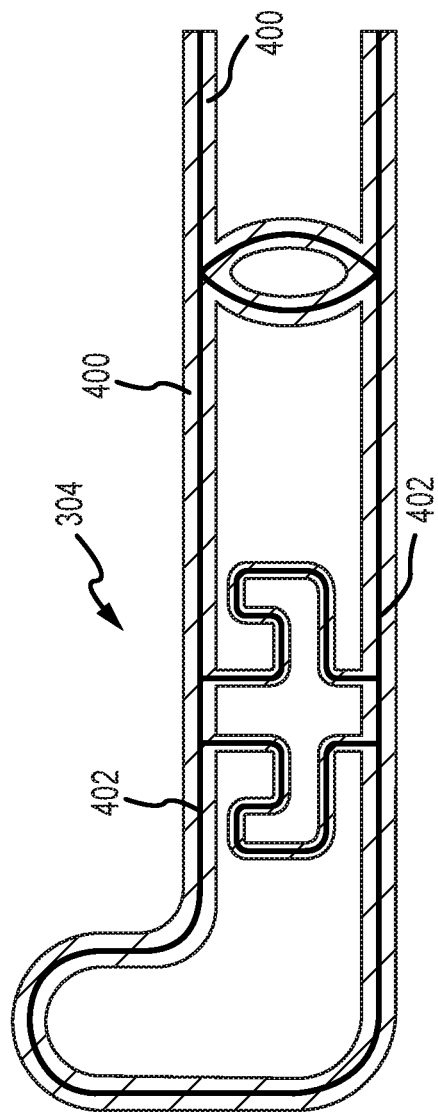
FIG. 15A
FIG. 15B

ASYMMETRICALLY-SHAPED ISOLATOR

CROSS REFERENCE TO RELATED APPLICATION

This application is a continuation application of and claims priority to U.S. patent application Ser. No. 15/636,139 filed Jun. 28, 2017, now U.S. Pat. No. 10,570,984, titled "ASYMMETRICALLY-SHAPED ISOLATOR", which is incorporated by reference in its entirety herein.

FIELD OF THE INVENTION

Embodiments of the present invention generally relate to an isolator for components and instrumentation to isolate vibrations, shocks, static or quasi-static loads, thermal loads, and electrical currents, and more specifically to an asymmetrically-shaped isolation device that experiences uniform motion under quasi-static loading and that distributes the effective modal mass across a range of frequencies.

BACKGROUND OF THE INVENTION

Mission success of spacecraft, aircraft, and rockets is dependent upon components and instrumentation (collectively referred to as "components" herein) continuing to operate throughout an entire flight and beyond deployment, for example, in the case of a satellite. But such components are often sensitive to launch and spacecraft dynamic environments. These dynamic environments can include vibrations having a wide range of frequencies and shocks, varying temperatures, and exposure to unintended electrical currents. The more severe the dynamic environment, the more costly it can be to protect the components.

Previous attempts have been made to manufacture isolators that isolate components from shock and vibrations. Such isolators may be found in, for example, spacecraft, aircraft, the automotive industry, and industrial manufacturing. These previous isolators include: springs and elastomer isolators integrated in a chassis structure through nut and bolt connections, wire rope isolators that traditionally have a higher load capacity than elastomers, constrained layer dampeners, and tuned mass dampeners. Alternatively, the operation of an instrument or component may be regularly adjusted and corrected to account for the effects of a dynamic environment by using a co-located accelerometer or other sensor that provides feedback for purposes of making such corrections. Existing isolators include both passive and active isolators. However, these prior art isolators are inadequate at isolating the component from a range of vibration frequencies—including high and low frequencies—and typically do not isolate the component from thermal loads and electrical currents. Some solutions include relocating the components to a different area of the vehicle or structure where the dynamic environment may be different and/or providing the components and/or isolators with a more robust design. One such solution is to add a dumb mass to an existing isolator and associated component subsystem. The dumb mass shifts or alters the characteristics of the system to respond differently and avoid targeted vibrations. Any weight, including dumb mass weight, is costly in some industries, such as the aerospace industry where weight is limited. Therefore, adding extra weight like the dumb mass can be a significant disadvantage. Other solutions use analysis corrections to compensate for the unwanted environmental frequencies detected by the instrumentation.

Wire rope isolators use friction in the wire rope to help absorb vibration and energy. In some situations, wire rope isolators often use a series of wire rope loops where each loop is the same size and shape. Such devices only dampen one mode or a relatively narrow frequency range. Other wire rope isolators may include two or three differently sized wire rope loops, and these isolators will only dampen two or three specific modes or two or three narrow frequency ranges. Another disadvantage is that wire rope will twist when configured into the final isolator design, requiring adding an axial pin to prevent twisting and to compel axial movement, i.e., to keep the isolated component moving up and down in the axial direction. Wire rope isolators also include parts to secure the rope, axial pin, and any platform interconnected to the isolated component. Every extra part in an isolator is another part that can break, that adds extra weight, and that must be manufactured and assembled. Further, every additional part is another piece that can vibrate, rattle, or come loose and damage other components. Therefore, any extra part is a disadvantage of the isolator design. Wire rope isolators are also difficult, expensive, and time-consuming to modify or customize.

Prior art isolators also tend to be symmetrical in design. The symmetry is often driven by manufacturability considerations. However, symmetry can be a disadvantage. Symmetry in an isolator tends to enable greater effective modal mass which provides a mechanism to drive loads into an isolated component, whereas an asymmetrical design according to aspects of the present disclosure distributes effective modal mass and reduces loads experienced by an isolated component. Asymmetry can be introduced into wire rope designs by the fact that the ends of the rope may need to be tied, overlapped, or secured in a way that creates asymmetry, or where the wire strands used to construct the wire rope are non-uniform. But such modest asymmetry has little overall positive effect, is often an unintentional artifact of the manufacturing process, and is not a deliberate design choice.

Accordingly, there exists a significant and long-felt need for an isolation device that isolates vibrations, shocks, static loading, thermal loads, and electrical currents and that distributes the effective modal mass across a broad range of frequencies.

SUMMARY OF THE INVENTION

Aspects of the present disclosure relate to a novel system, device, and methods for providing an isolator that limits a component's exposure to vibration, shock, and static or quasi-static loads, and also limits the component's exposure to thermal loads and electrical currents. The novel isolator described herein isolates the component from a range of vibration frequencies and distributes the effective modal mass across a range of frequencies while maintaining uniform or substantially uniform displacement under static and quasi-static loading. The novel isolator outperforms conventional vibration isolators in terms of cost, schedule (manufacturing time and lead time), heat dissipation, electrical isolation, and performance.

The present invention was developed in the aerospace field, but is applicable to and can be used in at least the aeronautical industry, the automotive industry, and industrial processes and manufacturing.

Spacecraft are subjected to a broad range of potentially damaging environmental conditions during flight, including shock and vibration. As a result, spacecraft components experience vibrations and frequencies that can affect the instrumentation's operation, performance, and/or output. Embodiments of the present invention reduce vibration and other mechanical forces, and dissipate undesired thermal and electrical energy, to enable more reliable flight measurements and instrument output.

It is one aspect of embodiments of the present invention to provide an isolator that has a deliberate asymmetrical shape, as opposed to being unintentional, slightly asymmetrical due to the manufacturing process. Isolators according to embodiments of the present invention have asymmetrical shapes comprised of multiple lobes, where the multiple lobes have a different shapes, sizes, weights, and/or densities. Each lobe may be differently configured or groups of lobes may be differently configured. An isolator may have two or more lobes. As will be readily understood upon a review of the present disclosure, additive manufacturing is well suited to manufacturing the present isolators.

It is one aspect of embodiments of the present invention to provide an isolator that distributes the effective modal mass. The effective modal mass provides a method for judging the "significance" of a vibration mode. Modes with relatively high effective masses can be readily excited by base excitation. On the other hand, modes with low effective masses are less readily excited by the same base excitation. Generally speaking, for a given object, the first mode has a much higher effective modal mass than the second mode. Similarly, the second mode has a higher effective mass than the third mode, and so on. Thus, the first mode can be readily excited by base excitation. The sum of the effective masses for all of the modes equals the total system mass. For example, asymmetry in the isolator tends to distribute input energy (e.g., from vibration, etc.) into more bands than a symmetrical design, which, in turn, reduces the loads experienced by the component interconnected to isolator across a wider range of frequencies that do not exceed a threshold that prohibits component function. Thus, at a given frequency, one or perhaps a few lobes are excited and the remaining lobes will remain generally static such that they are not materially participating in or contributing to the oscillating motion. The excited lobes will dissipate energy without transferring the energy to the platform with the isolated component, while the static (non-moving) lobes act as anti-nodes—the return of propagated energy or information occurs at just the right time to cancel the propagated energy or information on the non-moving lobes. By reducing the effective modal mass, the asymmetrical design more effectively isolates the component from harmful input energy across a wider range of frequencies. While all lobes receive an energy input (e.g., from the vibration), the energy does not affect all lobes equally, i.e., some lobes are excited, excited to different degrees, and/or some are not excited at all. Even if all of the lobes have different effective resonant frequency ranges, all of the lobes could be oscillating at the same time because the component may be experiencing multiple different vibrations with different frequencies at the same time, such as in random vibration applications. Thus, the lobes use velocity (i.e., oscillation) to dampen the vibrations. The lobes also use material friction and internal friction to absorb vibrations, which may be harmful to the component.

The "effective" frequency range is used because perfect tuning is not precisely required since dynamic absorption occurs over a close matching range of about 5%. The tuned mass damper effect or dynamic absorption will occur when the frequency of a lobe approaches the system resonance and at frequencies slightly above. Consider A+B, if A=20 Hz and B=20.3 Hz, then A+B couples. If A=20 and B=33 then A and B remain uncoupled. For example, A may be the isolator system mode that can damage the part, and B may be the attachment mode of the specific lobe in consideration.

It is another aspect of embodiments of the present invention to provide an isolator with different lobes, where the lobes distribute an effective modal mass across different effective frequencies ranges. For example, one lobe may distribute an effective modal mass across a first effective frequency range, a second lobe may distribute an effective modal mass across a second effective frequency range, a third lobe may distribute an effective modal mass across a third effective frequency range, and a fourth lobe may distribute an effective modal mass across the fourth effective frequency range, etc. One or more lobes may distribute the effective modal mass across the same effective frequency range or each lobe may distribute the effective modal mass across different effective frequency ranges. The effective frequency ranges may be discrete and not overlap at all or the effective frequency ranges may overlap. For example, the first effective frequency range may be between about 75 Hz and about 125 Hz, the second effective frequency range may be between about 175 Hz and about 225 Hz, and the third effective frequency range may be between about 275 Hz and about 325 Hz. Alternatively, the effective frequency ranges may be smaller, larger, and/or may overlap.

It is one aspect of embodiments of the present invention to provide an isolator that can be modified or created to target different frequencies for each application. For example, a microphone isolation application will be different than an accelerometer which is different from a circuit board, etc. Therefore, in each application the resonance frequencies of the isolated components can be targeted. It is not always trivial to determine the resonance frequencies due to size limitations, cost, and time. However, because of the random nature of the asymmetry in the isolator, there is a better chance that the asymmetrical isolator will cover a resonance frequency experienced by the component over a given frequency band than a symmetrical isolator with less resonance modes.

Another aspect of embodiments of the present invention is to provide an isolator that maintains uniform static displacement and uniform motion under static and quasi-static loading. In some embodiments, the isolator maintains uniform static displacement within a circumferentially oriented lobe framework. The isolator experiences static deformation and uniform motion under static and quasi-static loading because each asymmetrical lobe is designed and constructed to be statically equivalent to the other lobes under a predetermined static and quasi-static load. Uniform motion under static and quasi-static loading enables the maximum amount of travel by the isolator, which is desired. Embodiments of the present invention outperform wire rope isolators in this regard because wire rope isolators do not uniformly translate under quasi-static gravity loading because of the inherent twist associated with wrapping of the wire rope strands.

The instrumentation being isolated also may be sensitive to rotational motion. Gyroscopes for example are not sensitive to translations, but are sensitive to local rotations. In comparison, components isolated by embodiments of the present invention experience uniform translation without inducing torsion due to the uniform motion of the isolator under static or quasi-static loading. For example, one embodiment comprises two spaced-apart, generally-parallel, planar platforms interconnected by a plurality of circumferentially oriented lobes. Because the lobes are designed to impart uniform displacement and motion on the upper platform, to which the component or instrument is attached, the component or instrument will experience uniform motion under static and quasi-static loading. By providing uniform motion—for example, uniform up and down motion—to the upper platform, the component or instrument will remain in its orientation without twisting or turning. Additionally, depending on the configuration, the lower platform may also need to experience uniform displacement along with the upper platform, for example if the bottom of the platform and bottom of the lobes are not flush against a main securing structure. In that case, the lobes connected to lower platform would be designed also to provide uniform displacement under static and quasi-static loading.

Further, one aspect of embodiments of the present invention is to provide an isolator that isolates higher frequency vibrations of higher order modes through dynamic absorption of the asymmetrical lobes. Dynamic absorption is the process in which the resonance frequency of component A separately is matched by the resonance frequency of component B such that the resulting system coupling, A+B, reduces the dynamic amplification at the resonance frequency of component A separately due to the coupling of component B. The coupling of component B alters the natural frequency of the previously separate component A, which dissipates the original resonance frequency response of component A. Thus, potentially dangerous wave propagation in component A is "absorbed" by component B. For example, one lobe of the isolator may isolate a first harmful frequency or mode by deforming in a first way and having a first mode shape, and that same lobe may isolate a second harmful frequency or a higher order mode by deforming in a second way and having a second mode shape. Symmetrical isolator designs do not have the flexibility to target as many frequencies through dynamic absorption. Typically, the ideal frequencies to isolate are those frequencies that are harmful to the component.

Moreover, it is one aspect of embodiments of the present invention to provide an isolator that has a reduced higher frequency response, meaning the isolator reduces the high frequency spikes seen on a transmissibility versus frequency graph. It is another aspect of embodiments of the present invention to provide an isolator that can isolate low frequencies and high frequencies through dynamic absorption. Low frequencies tend to drive loads into big items, while high frequencies tend to drive responses by small items because small items can move very fast considering they do not have much mass.

Another aspect of embodiments of the present invention is to provide an isolator that can also reduce thermal loads and that can isolate vibrations after experiencing high temperatures for long periods of time. In one embodiment, the isolator has a silicone exterior coating. The coating serves at least two functions. The first is to seal the inherent outgassing nature of elastomeric UV cured 3D printed damping materials of one embodiment of the invention. The second purpose of the coating is to decrease the isolators temperature on orbit by coating the isolator with white which is less absorbent than black on orbit of the sun's radiation. In another embodiment, the isolator is made of silicone. In still other embodiments, the isolator is made of an elastomeric rubber-like material, such as Stratasys TangoBlackPlus of 70 durometer. Embodiments of the present invention include isolators that have improved vibration isolation at higher temperatures. For example, in some embodiments the isolator becomes more gelatinous-like at higher temperatures and, therefore, performs better at higher temperatures because the isolator is more absorbent when it is more gelatinous-like. Additionally, when the isolator is more gelatinous-like, there is not an adverse effect from the isolator bottoming-out (i.e., the upper platform hitting the bottom platform or structure) because when the isolator is in this gelatinous state, the absorbency of vibrations is improved and the vibrations resulting from bottoming-out does not damage the component.

Traditionally, elastomeric material is generally more sensitive to thermal loads than wire rope, which means that wire rope isolators normally perform better than elastomeric isolators at high temperatures. Therefore, it was an unexpected result that elastomeric isolators of the present invention performed well at high temperatures. In fact, the elastomeric isolators according to the present disclosure out performed wire rope isolators even at high temperatures where elastomeric isolators traditionally do not perform well. Traditional elastomeric material isolators also have a higher mass-to-load ratio than wire rope isolators, meaning greater weight density, which is not ideal for aerospace applications where additional weight is expensive. Further, traditional elastomeric material isolators can wear faster than wire rope isolators and may need to be replaced more often. Therefore, it was not an obvious design choice to make an isolator according to aspects of the present disclosure from an elastomeric material.

Another aspect of embodiments of the present invention is to provide an isolator that isolates electrical currents; elastomeric materials are poor conductors and are better suited to prevent transmission of electric currents.

One aspect of embodiments of the present invention is to provide an isolator that is cheap and quick to manufacture. Typically, items are manufactured with a symmetrical shape because it is often easier and cheaper to manufacture symmetrical items. However, embodiments of the present invention are asymmetrically shaped. Therefore, it is an aspect of embodiments of the present invention to provide an asymmetrically-shaped isolator that is cheap and quick to manufacture. For example, the isolator may be manufactured using additive manufacturing (i.e., 3D printing), significantly reducing the cost to manufacture as compared to traditional manufacturing methods. The reason for this result is that with 3D printing complexity comes at no extra cost. Moreover, isolators of the prior art include many parts, whereas isolators according to the present disclosure are a single piece. Additionally, isolators made according to the present disclosure have a lead time to manufacture measured in hours as compared to the prior art isolators, which have a lead time to manufacture that can be months long.

One aspect of embodiments of the present invention is to provide an isolator where the isolated component is positioned on the exterior of the isolator. Having the isolated component exterior to (rather than on the interior of) the isolator permits easy access to the component and allows the user to easily switch out the isolated component as needed. Additionally, if the component is located on the interior of the isolator, then the isolator typically requires a box mounting, which is heavy and requires more space than embodiments of the present disclosure. Because the isolators of the present disclosure are relatively small, multiple isolators can be used to isolate one large component. For example, one isolator could be positioned on each corner of a large box that needs isolation. However, internal located embodiments exist usually with the intent of exploiting center of gravity (CG) or center of geometry (CG) offsets.

One aspect of embodiments of the present invention is to provide a customizable isolator that can be modified and customized for each application. The isolator of the present invention can be easily tested and modified based on the test results. Additionally, the modifications are inexpensive and quick to make using additive manufacturing. The custom fit will also reduce chatter or vibrations induced from prior art interconnection mechanisms not perfectly fitting the isolated components.

A further aspect of embodiments of the present invention is to provide a one-piece integral isolator. A one-piece design reduces the part count and eliminates attachment hardware that can rattle and increase vibrations. In some embodiments, the isolator is all the same material. In other embodiments, the lobes and/or platform could be different materials, but the isolator would still be one piece. Additionally, traditional elastomeric isolators and wire rope isolators typically use a metallic attachment structure with a higher Q than an integral isolator design. Q is the quality factor for isolators and Q=(ωM)/b, where ω is the natural resonant frequency, b is the damping, and M is the isolated component. Decreasing Q reduces the response of the isolated component at all frequencies. Therefore, a lower Q means the isolated component will experience less vibrations and will come to rest quicker.

It is one aspect of embodiments of the present invention to provide an isolator that can be scaled to isolate small components (e.g., small electronic components), large components (e.g., humans, satellites, etc.), and components of in between sizes and shapes. As such, any number of lobes can be used and the lobes can be positioned between the two platforms like columns or extending from the outer edges of the platforms. Moreover, the lobes may have hard internal structures (e.g., a metal or other hard material endoskeleton) with external coatings or sleeves comprised of the damping material.

It is a further aspect of embodiments of the present invention to provide an isolator that operates effectively in the typical operating range (i.e., P95/50 or P99/90 statistical confidence levels) and that performs well in severe and/or unpredictable environments. Prior art aerospace isolators are designed to P95/50 or P99/90 statistical confidence levels, which degrades the performance of the isolator because the damping material must be stiffened to support 6 sigma (P99/90) loading at the cost of damping performance through elastic heat absorption. Accordingly, embodiments of the present invention do not sacrifice damping performance in order to perform at P99/90 statistical confidence levels. For example, the isolator may have lobes that are positioned and designed to interfere with or contact one another when total loading is sufficient. Total load is a combination of quasi-static loading plus dynamic loading. The first mode of the structure is a rocking or bounce mode that drives the majority of the dynamic displacement. Quasi-static loading is loading that is approximately constant at some time during flight.

In some embodiments, the isolator has a radial, planer shape with differently shaped and sized lobes that extend radially outward from a center of the isolator. The isolator has a platform at the center of the isolator. In additional embodiments, the isolator can have an upper platform and a lower platform at the center of the isolator and each lobe is connected to both the upper platform and the lower platform. The isolator could also have three platforms where some lobes are connected to the first and second platforms, some lobes are connected to the second and third platforms, and other lobes are connected to the first and third platforms. It is possible that the lobes could interfere with one another as they are moving, but the circumferential or radial spaced design minimizes the amount of interference between lobes. The lobes may be equally spaced apart from one another or can be spaced at different intervals around the circumference of the isolator center. The distance between the lobes can be measured in degrees as angles measured from the center point of the isolator.

When compared to prior art isolators, embodiments of the present invention had the lowest overall transmissibility under Maximum Predicted Environment ("MPE") conditions. The temperature of isolators according to the present invention only increased 2 degrees when at MPE plus 6 decibels (+6 dB), whereas the temperature of two prior art, conventional isolators increased 10 degrees when at MPE+6 dB. Embodiments of the present invention isolator were also tested with weight at MPE+6 dB and at high temperatures, 150° F. At high temperatures, the isolator of the present invention maintained stability and consistent transmissibility. Further, even when the present invention isolator bottomed out due to thermal heating, the isolator did not fail and actually maintained consistent transmissibility. The isolator of the present invention also had regional heat dissipation as compared to local heat dissipation of isolators of the prior art.

Isolators according to embodiments of the present invention reduce loads to components by asymmetry, which reduces the modal mass at discrete frequencies so any component placed on the isolator has a better chance of avoiding harmful resonances.

Isolators according to embodiments of the present invention also reduce loads to components by dynamic absorption of the lobes because the lobes can be tailored to dynamically absorb sensitive frequencies of components. For example, consider a component that is sensitive at 100 Hz and 200 Hz. Half the lobes could be tuned to 100 Hz and half of the lobes tuned to 200 Hz so they dynamically absorb two discrete frequencies. A symmetric design could only target one frequency. In the example just stated, the resultant system coupling, i.e., when you bolt the isolated part on the isolator, would now have four resonances at approximately ~90 Hz, ~110 Hz, ~180 Hz, and ~220 Hz. The modal mass at 100 Hz and 200 Hz was distributed to more bands so you have more resonances, but they are likely below an operable threshold that is no longer detrimental to the isolated component's operation. In the case of instrumentation isolation, the impacts are in the transducers noise floor.

Further, isolators according to embodiments of the present invention reduce loads to components by material damping.

And isolators according to embodiments of the present invention reduce loads to components by geometrical damping through the loads that cause waves to change directions, which cause displacement, which exercise the material, and which dampens the response. This applies to shock applications.

Methods of manufacturing an isolator according to embodiments of the present invention are also provided herein. In one embodiment, an asymmetrically-shaped isolator is provided comprising two or more lobes, where each lobe has a different resonant frequency. In another embodiment, each lobe has a different shape, size, density, and/or weight. In another embodiment, the lobes have the same static displacement under a given static or quasi-static load.

The first step in designing an isolator according to aspects of the present disclosure is to identify the component to isolate. Then the conditions the component will experience (e.g., vibration frequency, temperatures, shock sizes, etc.) are identified. The size of the isolator and the number of lobes is determined by the shape, size, and weight of the component and by the conditions the component will experience. For example, certain lobes of the isolator may need to be shorter to accommodate a long component (e.g., a microphone) or a larger isolator may be needed for larger components or multiple small isolators can be used with the large component. Additionally, heavier components will need heavier isolators because a dynamic absorber isolator should have at least 10% of the component's mass. If the isolator does not have a mass that is 10% of the component's mass, then a dumb weight will be added to the isolator. Additionally, if ten or more different vibration frequencies will be experienced, then the isolator will likely need more than two different lobes and will probably need more than five different lobes. The lobes' shapes and sizes are determined by starting with one lobe design that is feasible and that will isolate one of the vibration frequencies experienced by the component. Then design perturbations of the lobe (i.e., other lobes with different shapes, sizes, weights, densities, etc.) that have the same static displacement, as measured from the first end of the lobe, as the first lobe. Different combinations (i.e., shapes, weights, sizes, etc.) and thicknesses of lobes should be tested or modeled to see which lobes have the same static displacement as the first lobe. Additionally, each different lobe should perform differently under different modes or frequencies. Each static load should make the isolator and lobes experience uniform displacement from quasi static loading, i.e., all of the lobes will experience the same amount of displacement. An isolator with uniform displacement under quasi static loading is ideal because it will perform better than isolators without uniform displacement under static loading at low frequencies. The goal is also to maximize the displacement of the isolator, or the displacement of the upper platform with the component in some embodiments.

In one embodiment, an isolator is provided comprising: a first platform having an outer surface, an inner surface and a perimeter extending between the outer and inner surfaces; an interconnection member extending from the outer surface of the first platform and configured to interconnect with a component to be isolated from vibration; a second platform having an outer surface, an inner surface and a perimeter extending between the outer and inner surfaces, the second platform spaced from the first platform with the inner surface of the second platform facing the inner surface of the first platform; and a plurality of lobes having a first end and a second end, the first end interconnected to the first platform, the second end connected to the second platform and wherein the plurality of lobes extends radially away from the first and second platforms, the plurality of lobes selected from the group comprising: a first open loop having U-shaped curved portion proximate the first platform, a first linear portion, and a second linear portion disposed substantially perpendicular to the first linear portion and disposed proximate the second platform; a second open loop having a first linear portion disposed proximate the first platform, a second linear portion disposed substantially perpendicular to the first linear portion, and a U-shaped portion disposed proximate the second platform; a third open loop having a U-shaped portion; a fourth open loop having a first U-shaped portion disposed proximate the first platform, a second U-shaped portion disposed proximate the second platform, and a first linear portion disposed between the first and second U-shaped portions; and a fifth open loop having a first linear portion disposed proximate the first platform, a second linear portion disposed proximate the second platform and oriented substantially parallel to the first linear portion, and a third linear portion disposed between the first and second linear portions and oriented substantially perpendicular to the first and second linear portions; and wherein the first platform, second platform, and the plurality of lobes are one piece.

In additional embodiments, the first and second platforms and plurality of lobes are made from a polymer; the first and second platforms are substantially parallel; and/or each lobe in the plurality of lobes has a uniform thickness. In some embodiments, a first lobe in the plurality of lobes comprises: a first curved portion extending outwardly from the first end; a first substantially linear portion extending substantially vertically and upwardly from the first curved portion; a second curved portion extending outwardly from the first substantially linear portion; a second substantially linear portion extending substantially vertically and downwardly from the second curved portion; a third curved portion extending inwardly from the second substantially linear portion and interconnected to the second end of the first lobe; and wherein the uppermost portion of the first lobe extends a height above the upper surface of the upper platform. In further embodiments, the first curved portion of the first lobe has a first radius of curvature, the second curved portion of the first lobe has a second radius of curvature, and the third curved portion of the first lobe has a third radius of curvature, and wherein the second radius of curvature is the same as the third radius of curvature. Additionally, a second lobe in the plurality of lobes comprises: a first substantially linear portion extending substantially horizontally and outwardly from the first end; a first curved portion extending outwardly from the first substantially linear portion; a second substantially linear portion extending substantially vertically and downwardly from the first curved portion; a second curved portion extending inwardly from the second substantially linear portion; a third substantially linear portion extending substantially horizontally and inwardly from the second curved portion and interconnected to the second end of the second lobe; and wherein the uppermost portion of the first lobe extends a height above the upper surface of the upper platform. In some embodiments, the first end of the first lobe and the first end of the second lobe displace substantially the same distance when a predetermined quasi-static load is applied to the isolator. In other embodiments, the first lobe is positioned at an angle relative to the second lobe between about 30 degrees and about 180 degrees. In still further embodiments, the isolator further comprises a third lobe extending radially outwardly from the upper platform and the lower platform, the third lobe comprising: a first end interconnected to the outer perimeter of the upper platform; a second end interconnected to the outer perimeter of the lower platform; and a third shape having: a height measured from an uppermost portion of the third lobe to a lowermost portion of the third lobe; a width of the third lobe; a radial distance measured from the first end of the third lobe to a radial outermost portion of the third lobe; and a substantially uniform thickness of the third lobe; wherein the third shape is different than the first shape and the second shape in at least two of height, width, radial distance, and thickness. Moreover, the width of the first lobe is substantially uniform, the width of the second lobe is substantially uniform, and the width of the third lobe is substantially uniform. In various embodiments, the first lobe has a first effective resonant frequency range, the second lobe has a second effective resonant frequency range, and the third lobe has a third effective resonant frequency range, wherein the first effective resonant frequency range is different than the second effective resonant frequency range and the third effective resonant frequency range, and wherein the second effective resonant frequency range is different than the third effective resonant frequency range. In further embodiments, the first lobe reduces an effective modal mass at a first frequency, the second lobe reduces the effective modal mass at a second frequency, and the third lobe reduces the effective modal mass at a third frequency. Additionally, the first lobe distributes an effective modal mass across a first frequency range, the second lobe distributes the effective modal mass across a second frequency range, and the third lobe distributes the effective modal mass across a third frequency range. In some embodiments, the isolator further comprises an endoskeleton structure and a damping material positioned around the endoskeleton structure.

In one embodiment, an isolator for isolating a component is provided, comprising: a first platform having an upper surface, a lower surface, and a perimeter extending between the upper and lower surfaces; an interconnection member extending from the upper surface of the first platform and configured to interconnect with the component to be isolated from vibration; a second platform having an upper surface, a lower surface, and a perimeter extending between the upper and lower surfaces, the second platform spaced from the first platform with the upper surface of the second platform facing the lower surface of the first platform and with the upper surface of the second platform substantially parallel to the lower surface of the first platform; and a plurality of lobes having a first end interconnected to the perimeter of the first platform and a second end interconnected to the perimeter of the second platform, wherein the plurality of lobes extends radially away from the first and second platforms, and wherein each lobe in the plurality of lobes dynamically absorbs a different frequency.

In additional embodiments, at least one lobe in the plurality of lobes has a non-uniform cross-section and at least one lobe in the plurality of lobes is comprised of two or more materials.

In one embodiment, an isolator for isolating a component is provided consisting essentially of: an upper platform having an outer perimeter and an upper surface; an interconnection mechanism extending upwardly from the upper surface of the upper platform and interconnected to the component; a lower platform having an outer perimeter and positioned substantially parallel to the upper platform; a first lobe extending radially outwardly from the upper platform and the lower platform, the first lobe including: a first end interconnected to the outer perimeter of the upper platform; a second end interconnected to the outer perimeter of the lower platform; and a first shape having: a height measured from an uppermost portion of the first lobe to a lowermost portion of the first lobe; a width of the first lobe; and a radial distance measured from the first end of the first lobe to a radial outermost portion of the first lobe; a second lobe extending radially outwardly from the upper platform and the lower platform, the second lobe including: a first end interconnected to the outer perimeter of the upper platform; a second end interconnected to the outer perimeter of the lower platform; and a second shape having: a height measured from an uppermost portion of the second lobe to a lowermost portion of the second lobe; a width of the second lobe; and a radial distance as measured from the first end of the second lobe to a radial outermost portion of the second lobe; a third lobe extending radially outwardly from the upper platform and the lower platform, the third lobe including: a first end interconnected to the outer perimeter of the upper platform; a second end interconnected to the outer perimeter of the lower platform; and a third shape having: a height measured from an uppermost portion of the third lobe to a lowermost portion of the third lobe; a width of the third lobe; and a radial distance measured from the first end of the third lobe to a radial outermost portion of the third lobe; a fourth lobe extending radially outwardly from the upper platform and the lower platform, the fourth lobe including: a first end interconnected to the outer perimeter of the upper platform; a second end interconnected to the outer perimeter of the lower platform; and a fourth shape having: a height measured from an uppermost portion of the fourth lobe to a lowermost portion of the fourth lobe; a width of the fourth lobe; and a radial distance as measured from the first end of the fourth lobe to a radial outermost portion of the fourth lobe; and a fifth lobe extending radially outwardly from the upper platform and the lower platform, the fifth lobe including: a first end interconnected to the outer perimeter of the upper platform; a second end interconnected to the outer perimeter of the lower platform; and a fifth shape having: a height measured from an uppermost portion of the fifth lobe to a lowermost portion of the fifth lobe; a width of the fifth lobe; and a radial distance as measured from the first end of the fifth lobe to a radial outermost portion of the fifth lobe; wherein the first shape is different than the second, third, fourth, and fifth shapes in at least one of height, width, and radial distance.

In one embodiment, an isolator is provided comprising: a first platform having an outer surface, an inner surface and a perimeter extending between the outer and inner surfaces; a second platform having an outer surface, an inner surface and a perimeter extending between the outer and inner surfaces, the second platform spaced from the first platform with the inner surface of the second platform facing the inner surface of the first platform; a first lobe having a first end interconnected to the inner surface of the first platform and a second end interconnected to the inner surface of the second platform; a second lobe having a first end interconnected to the inner surface of the first platform and a second end interconnected to the inner surface of the second platform; wherein the first and second lobes are comprised at least partially of a damping material; wherein the first and second lobes displace an equal amount when experiencing an equal force; and wherein the first platform, second platform, and the plurality of lobes are one piece.

In additional embodiments, the isolator further comprises a third lobe having a first end and a second end, the first end interconnected to the perimeter of the first platform, the second end interconnected to the perimeter of the second platform, and wherein the third lobe extends radially away from the first and second platforms. In some embodiments, the first lobe has a shape selected from the group consisting of a sphere, an egg, a C-shaped column, and an ear. In various embodiments, when the isolator experiences sufficient loading a portion of the first lobe contacts a portion of the second lobe.

In one embodiment, a method of manufacturing an isolator for isolating a component is provided comprising: forming a first platform having an outer perimeter and an upper surface; forming an interconnection mechanism integrally with the first platform, the interconnection mechanism extending upwardly from the upper surface of the first platform for interconnecting to the component; forming a second platform having an outer perimeter and positioned substantially parallel to the first platform; forming a plurality of lobes integrally with the first platform and the second platform; wherein each lobe extends radially outwardly from the outer perimeter of the first platform and extends radially outwardly from the outer perimeter of the second platform; and wherein each lobe has a different shape, the shape comprising: a height as measured from an uppermost portion of the lobe to a lowermost portion of the lobe; a width of the lobe; a radial distance as measured from the outer perimeter of the first platform to a radial outermost portion of the lobe; and a substantially uniform thickness of the lobe.

In further embodiments, the method of manufacturing further comprises designing a first lobe in the plurality of lobes to have a first shape and a first size such that the first lobe dynamically absorbs a first frequency and deflects a predetermined distance when under a quasi-static load. In some embodiments, the first lobe deflects without rigid body rotation. In further embodiments, the method of manufacturing further comprises designing shapes and sizes of remaining lobes in the plurality of lobes such that the remaining lobes will dynamically absorb different frequencies than the first lobe and the remaining lobes will deflect the same predetermined distance as the first lobe when under a quasi-static load. The method may also include using additive manufacturing to form the first platform, the interconnection mechanism, the lower platform, and the plurality of lobes. Further, the forming steps occur simultaneously. In various embodiments, the plurality of lobes comprises four lobes or plurality of lobes comprises eight lobes. In some embodiments, each lobe in the plurality of lobes has a different resonant frequency range; each lobe in the plurality of lobes is positioned at an angle relative another lobe between about 30 degrees and about 90 degrees; and/or each lobe in the plurality of lobes has a first end interconnected to the outer perimeter of the first platform and a second end interconnected to the outer perimeter of the lower platform. Further, when the isolator is exposed to a predetermined quasi-static load, the first end of each lobe in the plurality of lobes is displaced a substantially uniform distance. Alternatively, the first end of each lobe in the plurality of lobes is positioned above and aligned with the second end of each lobe in the plurality of lobes. In an additional embodiment, the plurality of lobes, the first platform, and the lower platform are one piece.

For purposes of further disclosure, the following references generally related to isolators are hereby incorporated by reference in their entireties:

U.S. Pat. No. 3,270,998 to Keetch ("Keetch"), which discloses an isolator with elastomeric loops formed of end walls; Keetch, however, positions the loops in a series, meaning that the loops are vertically stacked instead of in a horizontal plane like the present invention;

U.S. Patent Publication No. 2016/0123422 to Keinanen et al., which discloses a self-tuned mass damper with three differently sized spring wires to dampen three different frequencies;

U.S. Pat. No. 4,586,689 to Lantero, which discloses a shock absorber with cables wound in three different manners/shapes to increase the shock absorption;

Russian Patent No. SU 1395867 to Antipov et al., which discloses a shock and vibration isolator that uses cables positioned in an asymmetrical shape;

U.S. Pat. No. 6,135,390 issued to Sciulli et al. on Oct. 24, 2000, which discloses an isolator using constrained layer damping and electrical loads and piezoceramic wafers;

U.S. Pat. No. 3,322,379 issued to Flannelly on May 30, 1967, which discloses a dynamic anti-resonant vibration isolator that is a tuned mass damper;

U.S. Pat. No. 6,012,680 issued to Edberg et al. on Jun. 11, 2000, which discloses a passive lateral vibration isolation system with a lobe/joint construction for a spacecraft launch vehicle; and U.S. Pat. No. 7,214,179 issued to Miller, III et al. on May 8, 2007, which discloses a low acceleration sensitivity microphone.

For purposes of further disclosure, the following references generally related to asymmetrically-shaped isolators are hereby incorporated by reference in their entireties:

U.S. Pat. No. 3,450,379 issued to Nolan on Jun. 17, 1969;
U.S. Pat. No. 8,262,068 issued to Monson et al. on Sep. 11, 2012;
European Patent No. EP 2,639,476 to Axel et al. published on Sep. 18, 2013;
U.S. Pat. No. 3,204,913 issued to Lawrence et al. on Sep. 7, 1965; and
U.S. Pat. No. 4,991,827 issued to Taylor on Feb. 12, 1991.

For purposes of further disclosure, the following references generally related to an isolator using wire rope are hereby incorporated by reference in their entireties:

PCT Patent Publication No. WO 2013/153173 to Sebert Schwingungstechnik GmbH published on Oct. 17, 2013;
European Patent No. EP 1,666,760 issued to Enidine Inc. on Jun. 7, 2006;
U.S. Pat. No. 6,002,588 issued to Vos et al. on Dec. 14, 1999;
U.S. Pat. No. 8,640,593 issued to Hazan on Feb. 4, 2014;
U.S. Pat. No. 6,406,011 issued to Kosar et al. on Jun. 18, 2002;
U.S. Pat. No. 6,244,579 issued to Latvis, Jr. on Jun. 12, 2001; and
U.S. Pat. No. 7,303,185 issued to Sebert Schwingungstechnik GmbH on Dec. 4, 2007.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description, the drawing figures, and the exemplary claims set forth herein, taken in conjunction with this Summary of the Invention, define the invention.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and, together with the general description of the invention given above and the detailed description of the drawings given below, serve to explain the principles of the invention.

FIG. 15A is a side elevation view of an isolator for a large item;

FIG. 15B is a cross-sectional view of an isolator for a large item;

The drawings are not necessarily to scale and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The orientation and directions as used herein are relative to the drawings as illustrated. Therefore, it should be appreciated that the terms "above," "below," "top," "bottom," "horizontal," or "vertical," are used to describe the relative location of different parts of the isolator (e.g., the lobes or platforms) and are intended to include not only a vertical or horizontal alignment. Specifically, following launch, the position of the spacecraft may no longer remain vertical but may have other orientations. Thus, the isolator may be oriented differently in flight, but the relative position of the isolator is as described. Thus, the isolator may be in the position shown in the figures when in the launch configuration, or the isolator may be turned 90 degrees, or any other angle between 0 and 360 degrees, when in the launch configuration.

Figure 1:
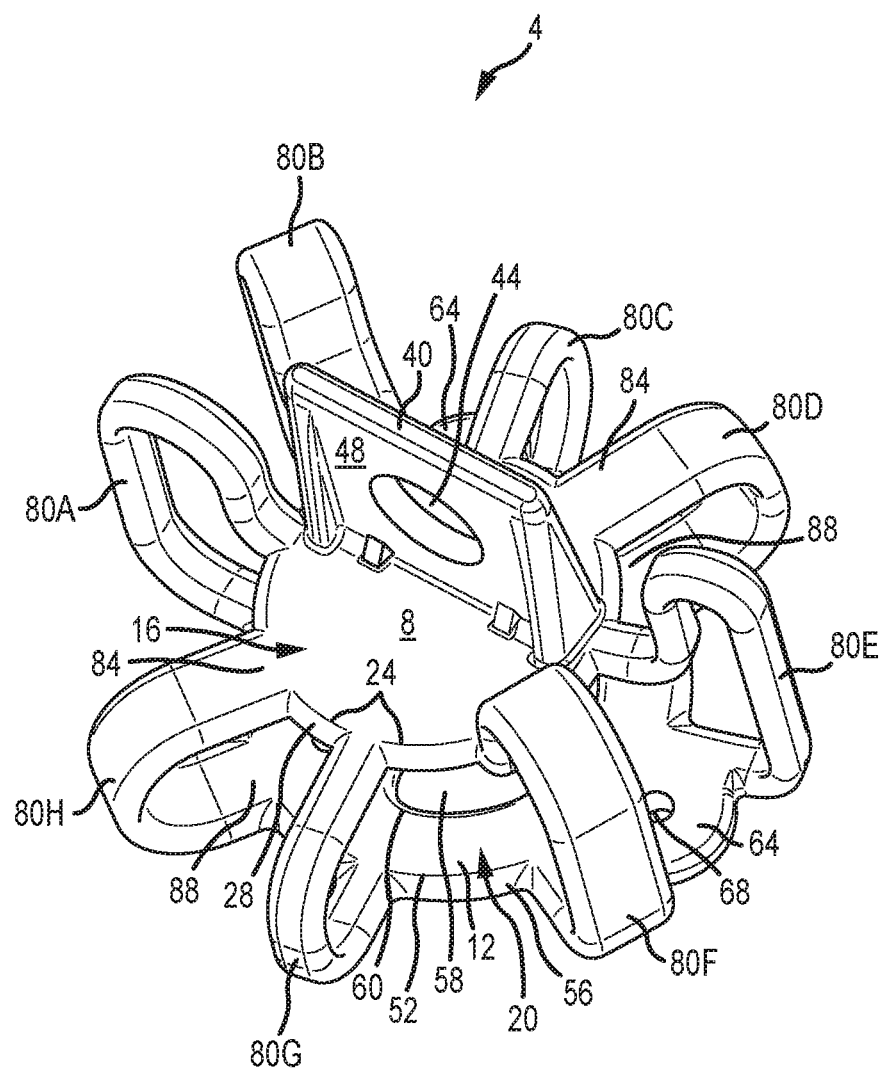
FIG. 1 is a top perspective view of one embodiment of the isolator.
Figure 2:
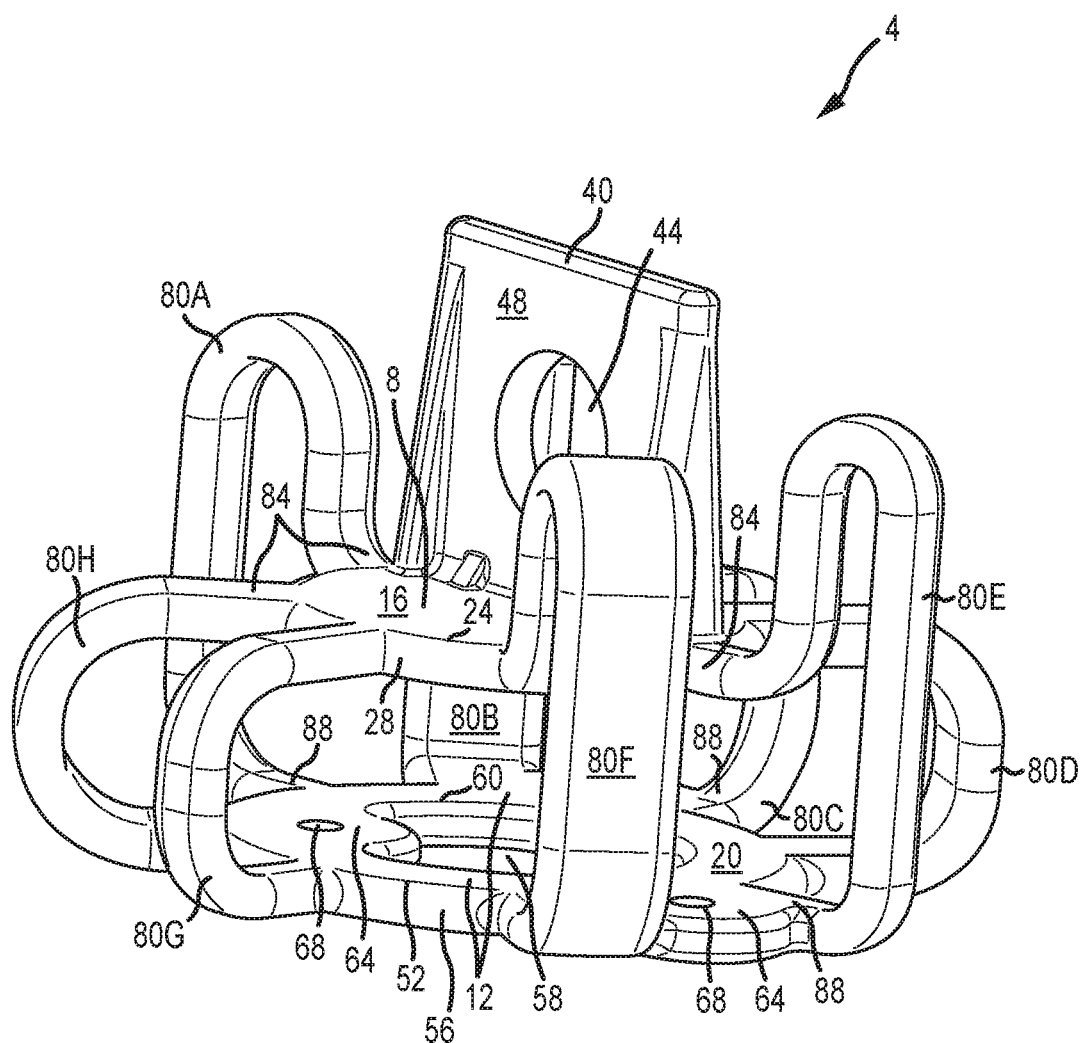
FIG. 2 is a side perspective view of the isolator.

FIG. 1 is a top perspective view of one embodiment of the isolator 4 according to aspects of the present disclosure, and FIG. 2 is a side perspective view of the isolator 4. The isolator 4 comprises an upper platform 8 (also called a "first platform" or a "platform" herein), and a lower platform 12 (also called a "second platform" or a "platform" herein), each with an upper surface 16, 20 and a lower surface (not shown). The upper surface 16 of the upper platform 8 is also called the outer surface 16 and the lower surface of the upper platform 8 is also called the inner surface because they are oriented outwardly and inwardly, respectively. The upper surface 20 of the lower platform 12 is also called the inner surface 20 and the lower surface of the lower platform 12 is also called the outer surface because they are oriented inwardly and outwardly, respectively. In some embodiments, the upper platform 8 is parallel to the lower platform 12, while in other embodiments the upper 8 and lower 12 platforms are not parallel. The upper and lower platforms 8, 12 can be the same size, shape, and thickness. In the embodiment shown, the upper platform 8 is the same shape (i.e., circular) as the lower platform 12, but the lower platform 12 has a larger diameter than the upper platform 8 and is, therefore, larger than the upper platform 8. The upper platform 8 can be a circular, oval, square, rectangular, hexagonal, octagonal, triangular, or ovoid shape or any other shape. The lower platform 12 can be a circular, oval, square, rectangular, hexagonal, octagonal, triangular, or football shape or any other shape and may be the same shape as the upper platform 8 or a different shape than the upper platform 8.

The upper surface 16 of the upper platform 8 has a perimeter edge 24 extending around the perimeter of the upper surface 16. The upper platform 8 has an outer perimeter (also called a "perimeter surface" or "perimeter" herein) 28 extending around the perimeter of the upper platform 8 and extending from the perimeter edge 24 of the upper surface 16 to the perimeter edge (not shown) of the lower surface. The outer perimeter 28 may be a side surface interconnecting an upper surface 16 and a lower surface of the upper platform 8. The perimeter surface 28 has a curved shape and extends outwardly from the upper surface 16 and lower surface of the upper platform 8. In other embodiments, the upper platform 8 perimeter surface 28 may be straight instead of curved and may be perpendicular to the upper 16 and lower surfaces or the perimeter surface 28 may be faceted. The upper platform 8 has a thickness as measured from the upper surface 16 to the lower surface. In some embodiments, the thickness of the upper platform 8 is substantially the same across the upper platform 8 and the upper surface 16 is substantially parallel to the lower surface. In other embodiments, the upper platform 8 thickness varies across the upper platform 8. The upper surface 16 and lower surface of the upper platform 8 may be substantially flat and smooth and may be oriented in a horizontal plane. Other embodiments may have surface features such as divots, bumps, or grooves in the upper surface 16 and/or lower surface of the upper platform 8. The upper platform 8 may be a solid piece without apertures or the upper platform 8 may have one or more apertures or slots extending from the upper surface 16 to the lower surface. The upper platform 8 can be solid across its thickness or can have a hollow interior.

An interconnection mechanism 40 (also called an "interconnection member" herein) extends upwardly from the upper surface 16 of the upper platform 8. The function of the interconnection mechanism 40 is to interconnect to and securely hold the component being isolated. The interconnection mechanism 40 can be any shape depending upon the component or instrument being isolated. For example, the interconnection mechanism 40 may have a rectangular shape with a circular aperture 44 extending from the front surface 48 (which can be substantially vertical) through to the back surface (which can be substantially vertical) and the circular aperture 44 may be sized to hold a microphone or other cylindrically-shaped component. In another example, the component may be a gyroscope in which case, the interconnection mechanism 40 may differ compared to that used with a microphone. Thus, the aperture 44 can have various shapes and sizes depending on the component being isolated.

The upper surface 20 of the lower platform 12 has a perimeter edge 52 extending around the perimeter of the upper surface 20. The lower platform 12 has an outer perimeter (also called a "perimeter surface" or "perimeter" herein) 56 extending around the perimeter of the lower platform 12 and extending from the perimeter edge 52 of the upper surface 20 to the perimeter edge (not shown) of the lower surface. The outer perimeter 56 may be a side surface interconnecting an upper surface 20 and a lower surface of the lower platform 12. The perimeter surface 56 has a curved shape and extends outwardly from the upper surface 20 and lower surface of the lower platform 12. In other embodiments, the lower platform 12 perimeter surface 56 may be straight instead of curved and may be perpendicular to the upper and lower surfaces or the perimeter surface 56 may be faceted. The lower platform 12 has a thickness as measured from the upper surface 20 to the lower surface. In some embodiments, the thickness of the lower platform 12 is substantially the same across the lower platform 12 and the upper surface 20 is substantially parallel to the lower surface. In other embodiments, the lower platform 12 thickness varies across the lower platform 12. The upper platform 8 and lower platform 12 can have the same thickness in some embodiments. In other embodiments, the lower platform 12 is thicker or thinner than the upper platform 8. The upper surface 20 and lower surface of the lower platform 12 may be substantially flat and smooth and may be oriented in a horizontal plane. Other embodiments may have surface features such as divots, bumps, or grooves in the upper surface 20 and/or lower surface of the lower platform 12. The lower platform 12 can be solid across its thickness or can have a hollow interior. The lower platform 12 may be a solid piece without apertures or the lower platform 12 may have one or more apertures or slots 58 extending from the upper surface 20 to the lower surface. The purpose of the lower platform 12 is to transition load from the isolated component to the structure, vehicle, or rocket to which the isolator 4 is secured. The lower platform 12 should use as little material as possible to reduce the weight of the isolator 4. Thus, the lower platform 12 has an aperture 58 to minimize the amount of material needed to form the lower platform 12. In the embodiment shown, the lower platform 12 has a center aperture 58 with an inner perimeter 60. The inner perimeter 60 may be curved, flat, or faceted. Additionally, the lower platform 12 has one or more attachment mechanisms 64 for interconnecting the isolator 4 to a structure. The attachment mechanisms 64 may extend outwardly from the outer perimeter 56 of the lower platform 12 or extending inwardly from the inner perimeter 60 of the center aperture 58. The attachment mechanism 64 can include one or more apertures 68 to receive one or more fastening devices such as screws, bolts, nails, rivets, or pins. The fastening device interconnects the isolator 4 to the structure.

The isolator 4 includes two or more lobes 80 extending radially outwardly from and interconnecting the upper platform 8 and the lower platform 12. The embodiment shown has eight lobes (collectively referred to as component numeral 80, individually referred to as component numeral 80A, 80B, 80C, 80D, 80E, 80F, 80G, 80H); however, any number of lobes 80 could be used depending on the size of the component to be isolated. A higher number of lobes 80 (e.g., over ten lobes 80) creates stress on the isolator 4 in specific points. Therefore, the ideal number of lobes 80 for smaller components is between about three lobes 80 and about ten lobes 80. For larger components—e.g., a 30- to 100-pound flight box, a seat for a passenger, or a satellite—the isolator 4 may have hundreds of lobes 80 including internal lobes 80. As discussed below, the shape of the lobes 80 may vary.

Each lobe 80 has a first end 84 integrally extending from the outer perimeter 28 of the upper platform 8 and a second end 88 integrally extending from the outer perimeter 56 of the lower platform 12. The lobes 80 extend radially outwardly from the first end 84 and radially outwardly from the second end.

For the purposes of explaining, FIGS. 3-6 show side views of various embodiments of isolator 4 lobes 80. The shapes of the lobes 80 will be described with reference to FIGS. 3-6. For example, some lobes 80A (FIG. 3) have an open loop having a U-shaped curved portion 100 proximate the first platform 8, a first linear portion 104, and a second linear portion 112 substantially perpendicular to the first linear portion 104 and positioned proximate the second platform. Other lobes 80 have an open loop having a first linear portion 124 disposed proximate the first platform 8, a second linear portion 104 substantially perpendicular to the first linear portion 124, and a U-shaped curved portion 100 proximate the second platform 12. Further lobes 80G (FIG. 5) have an open loop with a U-shaped portion. Still further lobes 80I (FIG. 4) have an open loop with a first U-shaped portion 100 disposed proximate the first platform 8, a second U-shaped portion 108 disposed proximate the second platform 12, and a first linear portion 104 disposed between the first U-shaped portion 100 and second U-shaped portion 104. Some lobes 80J (FIG. 6) have an open loop with a first linear portion 124 disposed proximate the first platform 8, a second linear portion 112 disposed proximate the second platform 12 and oriented substantially parallel to the first linear portion 124, and a third linear portion 104 disposed between the first and second linear portions 124, 112 and oriented substantially perpendicular to the first and second linear portions 124, 112.

Figure 3:
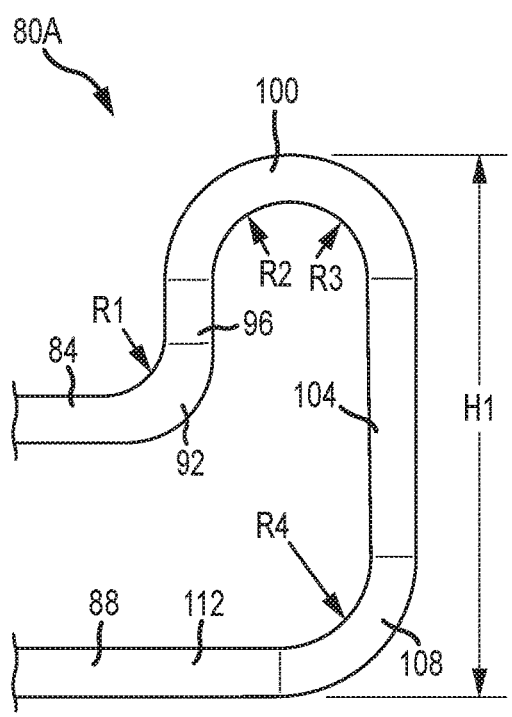
FIG. 3 is a side view of one embodiment of a lobe of an isolator.

As shown in FIG. 3, the lobe 80A may extend radially outwardly from the first end 84 to an inner curved portion 92, which is interconnected to an inner linear vertical portion 96. The inner curved portion 92 has a first radius of curvature R1. The inner linear vertical portion 96 is interconnected to a curved upper portion 100. The curved upper portion 100 has a second radius of curvature R2 and a third radius of curvature R3. Both radii of curvature R2, R3 may be the same such that the radius is constant across the curved upper portion 100 or the radii of curvature R2, R3 may be different. The curved upper portion 100 extends to and is interconnected to an outer linear vertical portion 104 interconnected to a curved lower portion 108 that extends inwardly to the second end 88. The curved lower portion 108 has a fourth radius of curvature R4. A lower linear horizontal portion 112 can be positioned between the second end 88 and the curved lower portion 108.

Figure 4:
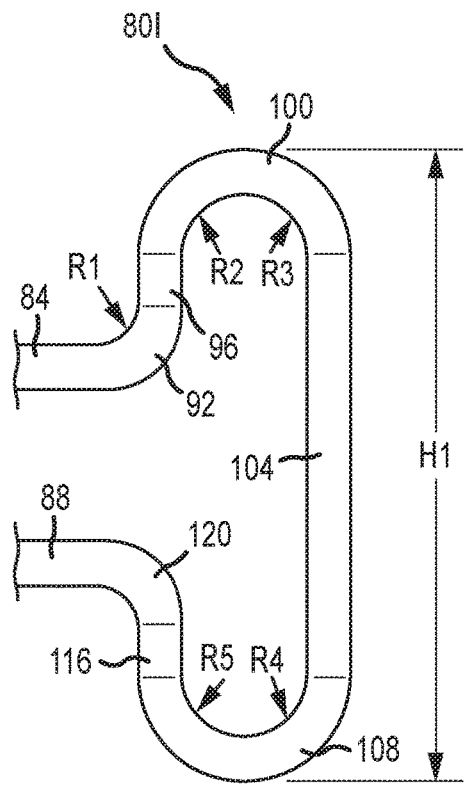
FIG. 4 is a side view of a second embodiment of a lobe of an isolator.

In some embodiments, the curved upper portion 100 of the lobe 80A has a radius of curvature R2, R3. The radius of curvature R2, R3 can be constant across the curved upper portion 100 or the radius of curvature R2, R3 can change across the curved upper portion 100. For example, one end of the curved upper portion 100 may have a second radius of curvature R2 while the other end of the curved upper portion may have a third radius of curvature R3. The radius of curvature R2, R3 of the curved upper portion 100 can be different for different lobes 80A-J or some lobes 80 may have the same curved upper portion radius of curvature R2, R3. In some embodiments, the curved lower portion 108 of the lobe 80A has a radius of curvature R4. The radius of curvature can be constant across the curved lower portion 108 or the radius of curvature R4 can change across the curved lower portion 108. For example, one end of the curved lower portion 108 may have a fourth radius of curvature R4 while the other end of the curved lower portion 108 has a fifth radius of curvature R5, as shown in FIG. 4. The radius of curvature R4 of the curved lower portion 108 can be different for different lobes 80A-J or some lobes 80 may have the same curved lower portion 108 radius of curvature R4. In some embodiments, the inner curved portion of the lobe 80 has a radius of curvature. The radius of curvature can be constant across the inner curved portion or the radius of curvature can change across the inner curved portion. For example, one end of the inner curved portion may have a first radius of curvature while the other end of the inner curved portion has a second radius of curvature. The radius of curvature of the inner curved portion can be different for different lobes 80 or some lobes 80 may have the same inner curved portion radius of curvature. Moreover, the curved upper portion radius of curvature may be the same or different than the curved lower portion radius of curvature and the inner curved portion radius of curvature.

Referring to FIGS. 3-6, each lobe 80A, 80I, 80G, 80J has a height H1 as measured from the lower-most portion of the lobe 80A, 80I, 80G, 80J to the upper-most portion of the lobe 80A, 80I, 80G, 80J. Each lobe 80 may have a different height H1, all lobes 80 may have the same height H1, or some lobes 80 may have the same height H1 while other lobes 80 have other heights H1. For example, the lobe 80I of FIG. 4 has a height H1 and the lobe 80A of FIG. 3 has a different height H1.

The lobe 80I of FIG. 4 is similar to the lobe 80A of FIG. 3, except that the lobe 80I extends downwardly below the second end 88. Thus, the lobe 80I extends radially outwardly from the first end 84 to an inner curved portion 92, which has a first radius of curvature R1 and is interconnected to an inner linear vertical portion 96. The inner linear vertical portion 96 is interconnected to a curved upper portion 100 with a second radius of curvature R2 and a third radius of curvature R3. Both radii of curvature R2, R3 may be the same such that the radius is constant across the curved upper portion 100 or the radii of curvature R2, R3 may be different. The curved upper portion 100 extends to and is interconnected to an outer linear vertical portion 104 interconnected to a curved lower portion 108 with a fourth radius of curvature R4 and a fifth radius of curvature R5, which may be the same as or different than the fourth radius of curvature R4. The curved lower portion 108 extends upwardly to a lower vertical portion 116 that is interconnected to a second inner curved portion 120. The second inner curved portion 120 extends inwardly to the second end 88.

Figure 5:
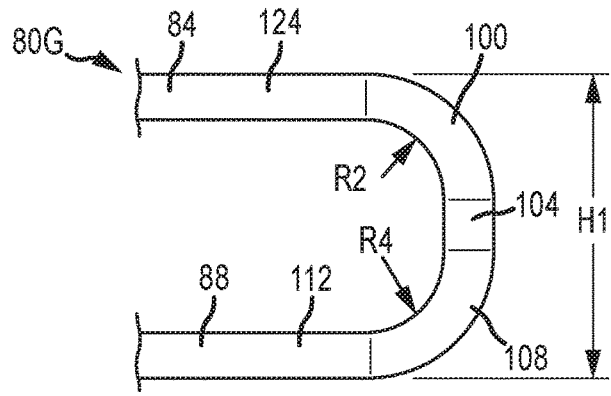
FIG. 5 is a side view of a third embodiment of a lobe of an isolator.

FIG. 5 shows a lobe 80G that extends outwardly from the first end 84 to an upper linear horizontal portion 124, which is interconnected to a curved upper portion 100. The curved upper portion 100 can be directly interconnected to a curved lower portion 108 or there may be an outer linear vertical portion 104 between the curved upper portion 100 and the curved lower portion 108. The curved lower portion 108 extends inwardly to the second end 88 of the lobe 80G. A lower linear horizontal portion 112 can be positioned between the second end 88 and the curved lower portion 108.

Figure 6:
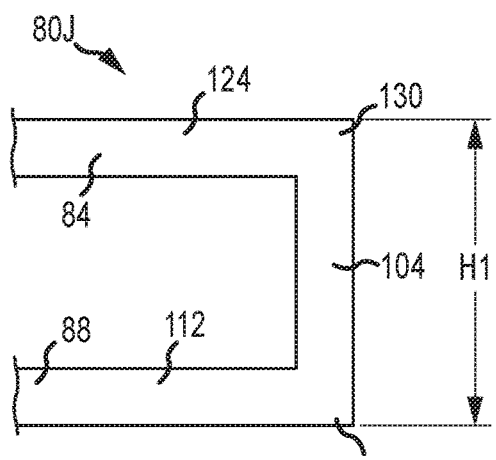
FIG. 6 is a side view of a fourth embodiment of a lobe of an isolator.

FIG. 6 shows another embodiment of a lobe 80J. This lobe 80J extends outwardly from the first end 84 to an upper linear horizontal portion 124 that interconnects to the outer linear vertical portion 104 at a first corner 130. The outer linear vertical portion 104 interconnects to the lower linear horizontal portion 112 at a second corner 134. The lower linear horizontal portion 112 extends inwardly to the second end 88.

Further, some lobes 80B, 80E (shown in FIGS. 1 and 2) include an upper linear horizontal portion 124 extending outwardly from the first end 84 and the upper linear horizontal portion 124 is interconnected to an inner curved portion 92, which extends to an inner linear vertical portion 96. The inner linear vertical portion 96 extends upwardly to the curved upper portion 100, which is interconnected to an outer linear vertical portion 104 that extends downwardly to a curved lower portion 108. The curved lower portion 108 extends inwardly to a lower linear horizontal portion 112 that is interconnected to the second end 88 of the lobe 80.

Figure 7:
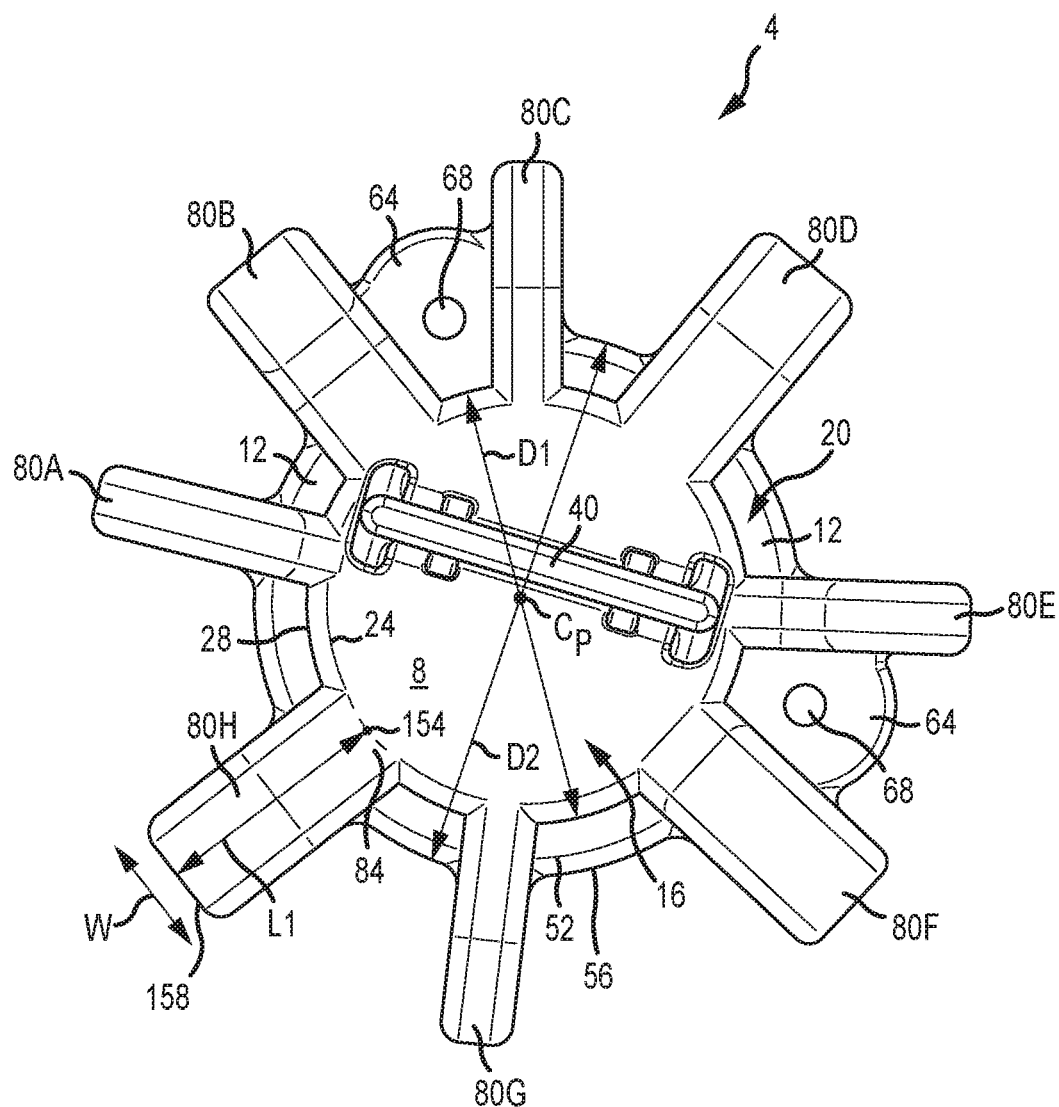
FIG. 7 is a top plan view of the isolator.

FIG. 7 is a top plan view of the isolator 4. As can be seen in FIG. 7, the upper platform 8 has a diameter D1 as measured from the outer perimeter 28 on one side to the outer perimeter 28 of the other side and the lower platform 12 has a diameter D2 as measured from the outer perimeter 56 on one side to the outer perimeter 56 of the other side. In the embodiment shown, the diameter D2 of the lower platform 12 is larger than the diameter D1 of the upper platform 8. The center point $C_p$ of the upper platform 8 can be positioned directly above and in line with the center point (not shown) of the lower platform 12 such that a vertical axis (150 in FIG. 8) of the isolator 4 extends through the center point of the lower platform 12 and the center point $C_p$ of the upper platform 8. In other embodiments, the center point $C_p$ of the upper platform 8 is not directly above and in line with the center point of the lower platform 12. In various embodiments, the first end 84 of a lobe 80 is positioned above and in line with the second end 88 of the lobe 80, such that the second end 88 of the lobe 80 is not visible in a top plan view. In other embodiments, the lobe 80 is twisted or has a helical orientation such that the second end 88 of the lobe 80 is positioned to the left or right of the first end 84 and at least a portion of the second end 88 is visible in a top plan view. The interconnection mechanism 40 can be positioned in the center of the upper platform 8 (i.e., be positioned on the center point $C_p$) or the interconnection mechanism 40 can be off-centered, for example, as shown in FIG. 7.

Overall, the lobes 80 extend radially outwardly from the upper platform 8 and lower platform 12. Each lobe 80 has a radial distance L1 measured from the junction 154 between the first end 84 at the perimeter edge 24 of the upper platform 8 upper surface 16 to the radial outmost portion 158 of the lobe 80. Each lobe 80 may have the same radial distance L1, some lobes 80 may have the same radial distance L1, or all lobes 80 may have different radial distances L1. Each lobe 80 has a width W. Typically, the width W of the lobe 80 is constant for the whole lobe 80. However, in some embodiments, the width W of the lobe 80 varies across the lobe 80, for example, the width W of the first end 84 may be larger than the width W of the second end 88, or vice versa. Alternatively, the width W of the radial outermost portion may be larger than the widths W of the first end 84 and second end 88 of the lobe 80. The lobes 80 can all have different widths W or some lobes 80 can have a first width W, while other lobes 80 have a second width W, and still other lobes 80 have a third width W, etc.

Figure 8:
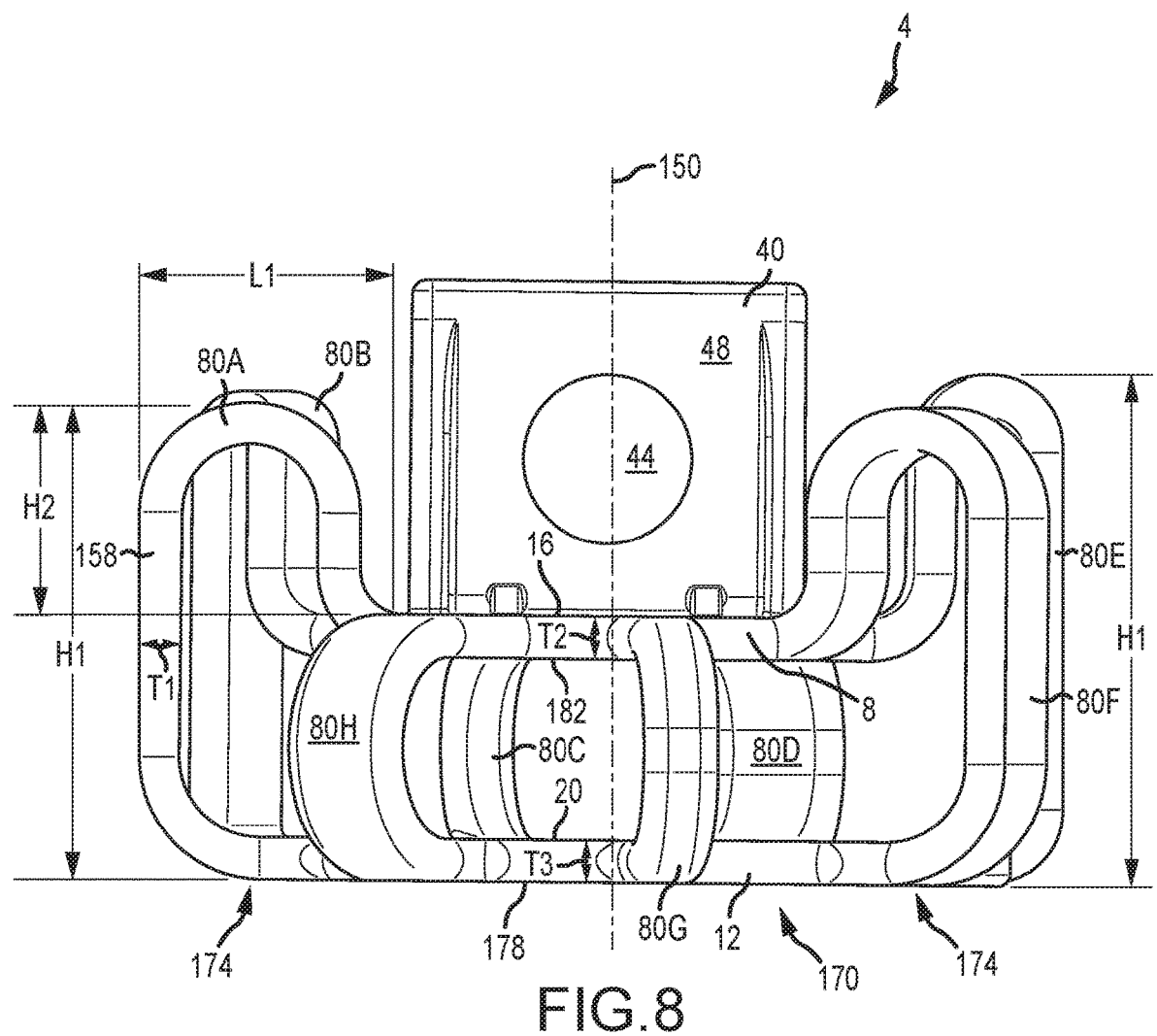
FIG. 8 is a front elevation view of the isolator.

FIG. 8 is a front elevation view of the isolator 4. The isolator 4 has a vertical axis 150. In the embodiment shown, the bottom or lower surface 170 of the isolator 4 is substantially flat to allow the isolator 4 to sit flat on a flat surface or otherwise interconnect to a structure. In this embodiment, the bottoms 174 of the lobes 80 are in line with the lower surface 178 of the lower platform 12. In alternative embodiments, the one or more lobes 80 extend downwardly below the lower surface 178 of the lower platform 12, i.e., as shown in FIG. 4.

In the embodiment shown, the two lobes 80G, 80H in front of the interconnection mechanism 40 (i.e., the two front lobes 80G, 80H) do not extend above the upper surface 16 of the upper platform 8. Rather, these lobes 80G, 80H extend outwardly and horizontally from the upper platform 8. This configuration is necessary if the component is long or large and, thus, the component extends outwardly forward from the interconnection mechanism 40 such that it is positioned above the two front lobes 80G, 80H. Therefore, the front lobes 80G, 80H must be short enough that they do not touch or contact the component. However, if the component does not extend forward over the front lobes 80G, 80H, then the front lobes 80G, 80H can be taller and extend above the upper platform 8 like the other lobes 80A-F. Additionally, the rear two lobes 80C, 80D can also extend outwardly and horizontally from the upper platform 8 and not extend above the upper surface 16 of the upper platform 8 if the component is long or large and, thus, the component extends outwardly and rearwardly from the interconnection mechanism 40. Alternatively, if the component does not extend rearward over the rear lobes 80C, 80D, then the rear lobes 80C, 80D can be taller and extend above the upper platform 8 like the other lobes 80A-B, 80E-F.

The shape of each lobe 80 relates to the target resonant frequency and the shape of each lobe 80 differs according to the target resonant frequency. Each lobe 80 has a radial distance L1 and each lobe 80 has a thickness T1, which can be constant across the whole lobe 80. Alternatively, the thickness T1 of a lobe 80 may change across the lobe 80, e.g., the first end 84 may be thicker than the second end 88 or the linear portion(s) may be thicker than the curved portion(s), etc. In one embodiment, all lobes 80 have the same thickness T1. In an alternative embodiment, each lobe 80 has a different thickness T1. And in further embodiments, one or more lobes 80 have a first thickness, one or more other lobes 80 have a second thickness, one or more other lobes 80 have a third thickness, etc. In some embodiments, the thickness T1 of the lobe 80 at the first end 84 is the same as the thickness T2 of the upper platform 8, and the thickness T1 of the lobe 80 at the second end 88 is the same as the thickness T3 of the lower platform 12. The thickness T2 of the upper platform 8 is measured from the upper surface 16 to the lower surface 182 of the upper platform 8. The thickness T3 of the lower platform 12 is measured from the upper surface 20 to the lower surface 178 of the lower platform 12.

Each lobe 80 has a height H1 as measured from the lower-most portion of the lobe 80 to the upper-most portion of the lobe 80. Each lobe 80 may have a different height H1, all lobes 80 may have the same height H1, or some lobes 80 may have the same height H1 while other lobes 80 have other heights H1. For example, the lobe 80A on the left has a height H1 and the lobe 80E on the right has a different height H1. Additionally, some lobes 80A-B, 80E-F extend a height H2 above the upper platform 8 as measured from the upper surface 16 of the upper platform 8 to the upper-most portion of the lobe 80A-B, 80E-F.

Figure 9:
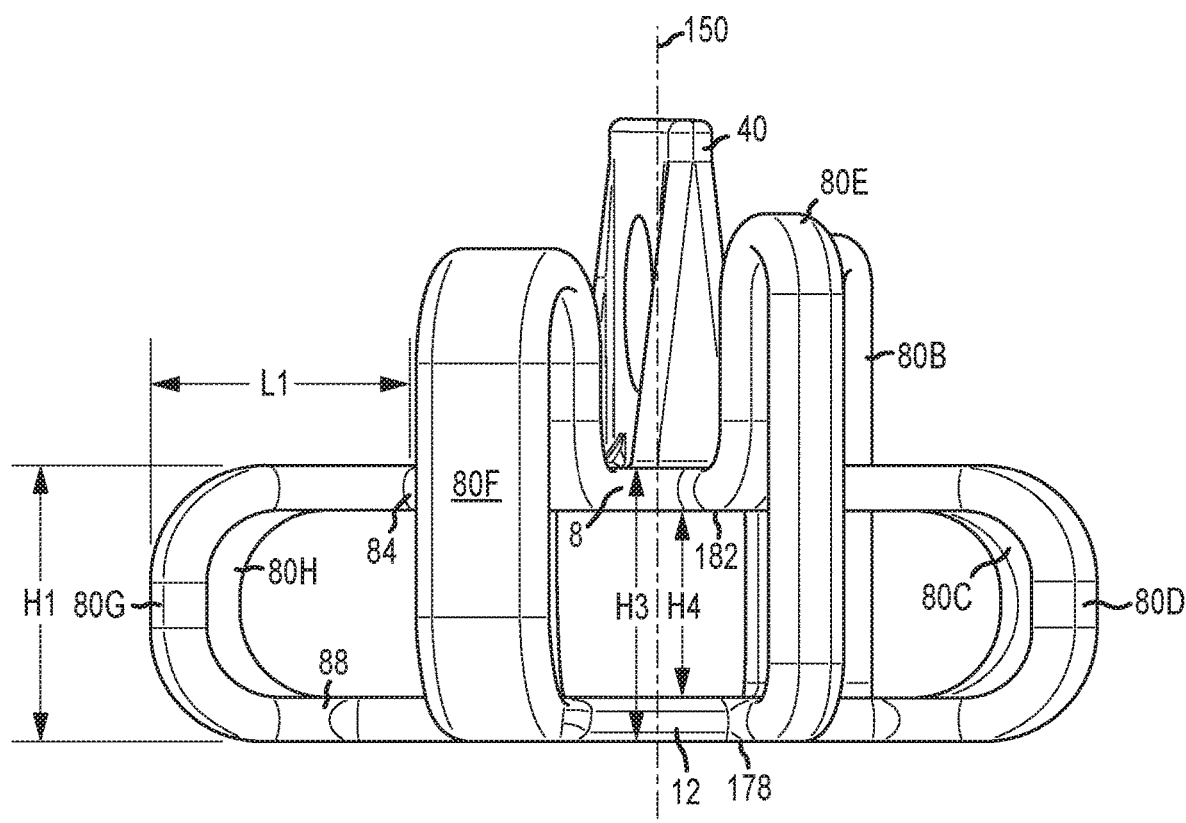
FIG. 9 is a side elevation view of the isolator.

FIG. 9 is a side elevation view of the isolator 4. Here, the height H1 of one lobe 80G is shown. The height H1 of the lobe 80G is less than the height H1 of other lobes 80F, 80E, 80B. The radial distance of the lobe 80G is also shown. The platform height H3 of the isolator 4 is measured from the upper surface 16 of the upper platform 8 to the lower surface 178 of the lower platform 12. The platform distance H4 is the distance between the upper and lower platforms 8, 12 as measured from the lower surface 182 of the upper platform 8 to the upper surface 20 of the lower platform 12.

In the embodiments shown in FIGS. 1-9, no two lobes 80 are exactly the same. More specifically, the lobes 80 have different shapes (e.g., different heights, widths, thicknesses, radial distances, etc. and/or have different radii of curvature), have different densities or weights, and/or are hollow or solid. However, in other embodiments, there can be groups of lobe that are the same shape and each group of lobes is a different shape than another group of lobes.

Figure 10:
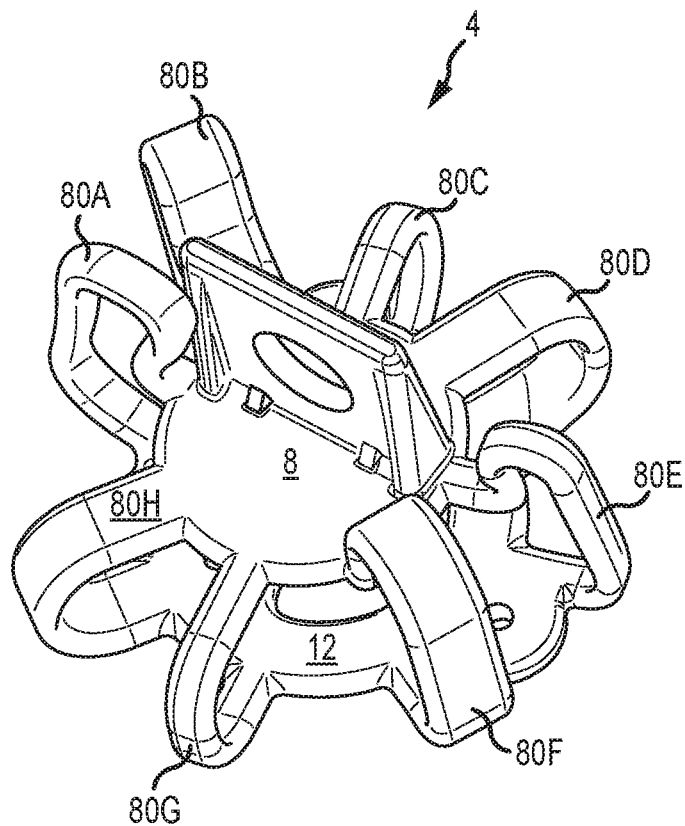
FIG. 10 shows the first mode shape of the isolator.
Figure 11:
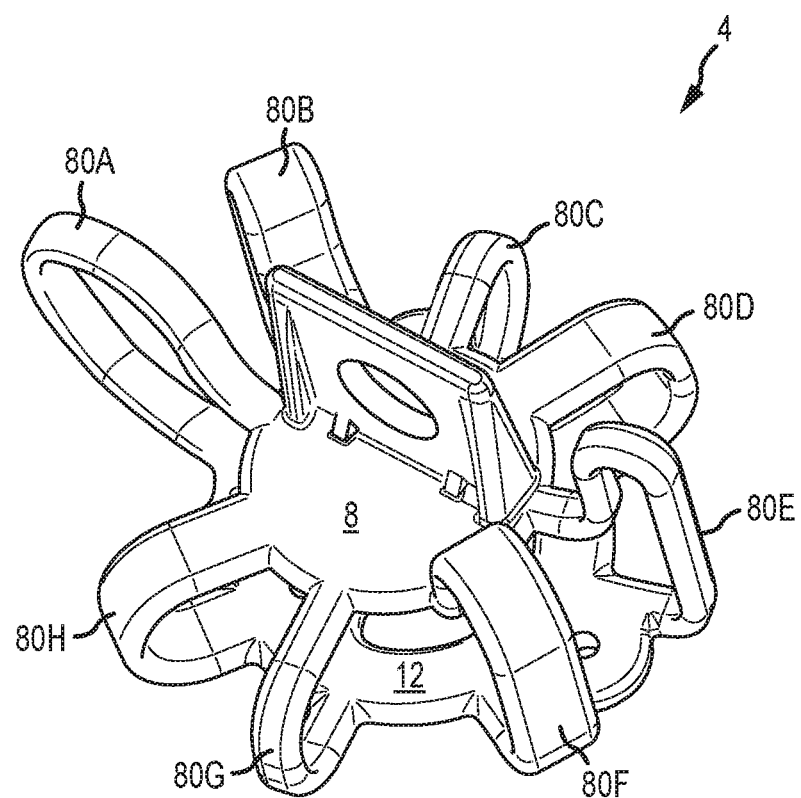
FIG. 11 shows the second mode shape of the isolator.

FIG. 10 shows the first mode shape of the isolator 4 and FIG. 11 shows the second mode shape of the isolator 4. The first mode is the mode of the isolator 4 at time t1 and experiencing vibrations with a first frequency. The second mode is the mode of the isolator 4 at time t2 and experiencing vibrations with a second frequency. The first mode shape is the shape of the isolator 4 during the first mode. The second mode shape is the shape of the isolator 4 during the second mode.

Each lobe 80 has a different resonant frequency, which also reduces the effective modal mass of the isolator 4 at a given frequency. Thus, the differently-shaped lobes respond differently to the input energy, allowing the isolator 4 as a whole to distribute the input energy into more bands than symmetrical isolator designs. As the isolator 4 experiences vibration or shock, one or more lobes 80A, 80E bend and oscillate to absorb the shock and/or vibration while the other lobes 80B-D, 80F-H remain generally static such that the component experiences a reduced vibration or shock.

As shown in FIG. 10, one lobe 80A is affected by the first mode and another lobe 80E is slightly affected by the first mode. Typically, the most damage to the isolated component occurs when it experiences the first mode because the first mode has the greatest amplitude. Here, the first mode shape of the isolator 4 includes six unaffected (or non-moving) lobes 80B-D, 80F-H, one affected lobe 80A, and one slightly affected lobe 80E. Additionally, the way the affected lobe 80A and the slightly affected lobe 80E are shaped during the first mode further defines the first mode shape of the isolator 4 when the isolator 4 is experiencing pure sinusoidal input. In practice, the isolator 4 will experience multiple inputs and frequencies; therefore, all of the lobes 80 may be oscillating.

The affected or oscillating lobes act similar to a node of an oscillating string and the non-moving lobes are the anti-nodes. Thus, under specific vibration conditions, one or more lobes will act as a node and will oscillate while the remaining lobes will not move and, thus, act as anti-nodes for that given mode. The number of nodes and anti-nodes may change depending on the mode. The non-moving lobes are anti-nodes and do not move because the energy input into these anti-nodes returns at the right time to cancel out the energy, again like the stationary points on an oscillating string.

Figure 10A:
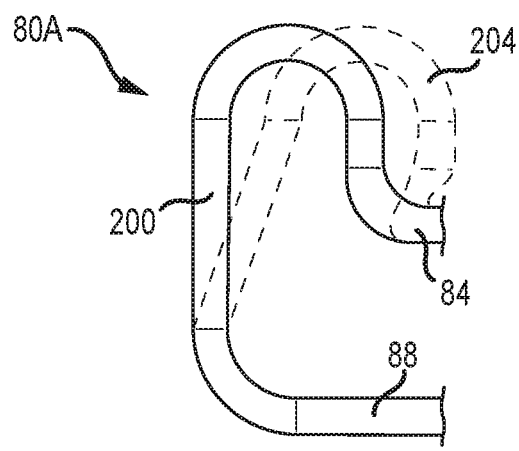
FIG. 10A shows the excited lobe of FIG. 10 before it was excited and after it was excited.

The way the affected lobe 80A is shaped during the first mode can be seen in FIG. 10A, which is a side elevation view of the affected lobe 80A before it is affected (200, shown in solid lines) and after it is affected (204, shown in dashed lines). Additionally, as can be seen in FIG. 10A, the first end 84 of the lobe 80A and the second end 88 of the lobe 80A does not move even when the lobe 80A is vibrating and has the first mode shape 204. This is true for pure sinusoidal input but may not be true in practice because all of the lobes 80 may be oscillating in practice.

As shown in FIG. 11, only one lobe 80A is affected by the second mode and the affected lobe 80A in FIG. 11 is the same lobe 80A as the affected lobe 80A in FIG. 10. Thus, the second mode shape of the isolator 4 includes seven unaffected (non-moving) lobes 80B-H and one affected lobe 80A when the isolator 4 is experiencing pure sinusoidal input. In practice, the isolator 4 will experience multiple inputs and frequencies; therefore, all of the lobes 80 may be oscillating. Additionally, the way the affected lobe 80A is shaped during the second mode further defines the second mode shape of the isolator 4. Specifically, the affected lobe 80A is shaped differently in FIGS. 10 and 10A than it is shaped in FIGS. 11 and 11A. Accordingly, each lobe 80 of the isolator 4 can dampen different modes or frequencies, which means that the dampening concept extends to higher order modes.

Figure 11A:
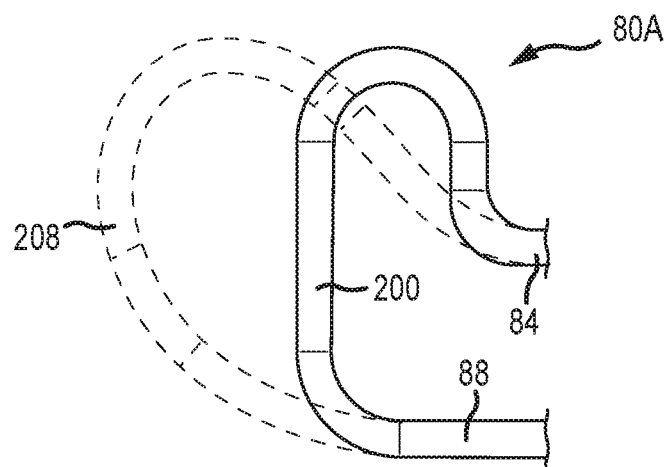
FIG. 11A shows the excited lobe of FIG. 11 before it was excited and after it was excited.

The way the affected lobe 80A is shaped during the second mode can be seen in FIG. 11A, which is a side elevation view of the affected lobe 80A before it is affected (200, shown in solid lines) and after it is affected (208, shown in dashed lines). Additionally, as can be seen in FIG. 11A, the first end 84 of the lobe 80A and the second end 88 of the lobe 80A does not move even when the lobe 80A is vibrating and has the second mode shape 208.

Figure 12:
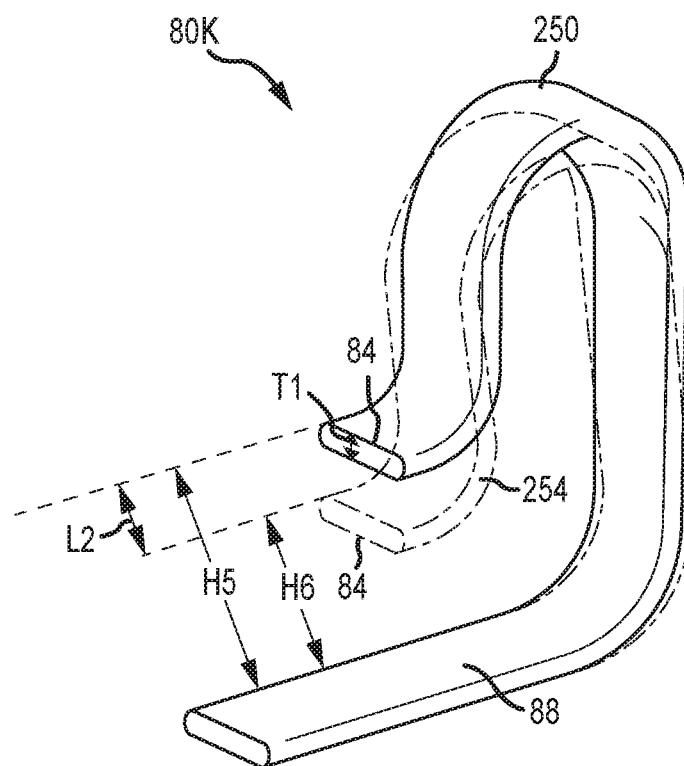
FIG. 12 shows one lobe before a load is introduced and the same lobe under quasi-static loading.

FIG. 12 shows one lobe 80K of the isolator 4 before a load is introduced (250, shown in solid lines) and the same lobe 80K under quasi-static loading (254, shown in dashed lines). The unloaded lobe 250 is cut at the first end 84 and the thickness T1 of the lobe 80K can be seen. The first end 84 of the unloaded lobe 250 is positioned an unloaded height H5 above the second end 88. When the lobe 80K is under quasi-static or static loading 254, it has a slightly different shape and the first end 84 is displaced downwardly a distance L2. Thus, the first end 84 of the loaded lobe 254 is positioned a loaded height H6 above the second end 88. The second end 88 does not move in the example shown in FIG. 12. The displacement amount L2 is measured by subtracting the loaded height H6 of the first end 84 of the lobe 80K after the load is applied 254 from the unloaded height H5 of the first end 84 of the lobe 80K before the load is applied 250, i.e., L2=H5−H6. The upper platform 8 of the isolator 4 is interconnected to the first end 84 of the lobe; therefore, the displacement of the first end 84 of the lobe 80K is the relevant point of reference because the portion of the upper platform 8 proximate the lobe's first end 84 will displace the same amount as the first end 84 of the lobe 80.

Figure 13:
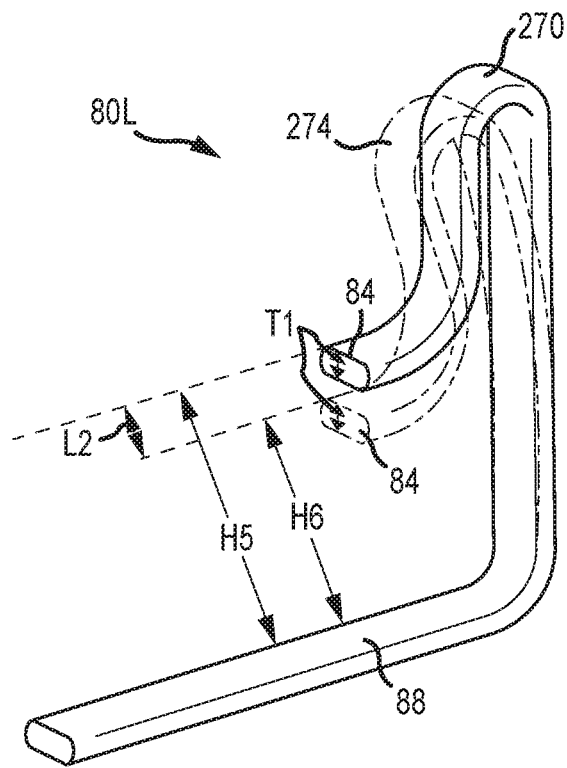
FIG. 13 shows another lobe before a load is introduced and the same lobe under quasi-static loading.

FIG. 13 shows another lobe 80L of the isolator 4 before a load is introduced (270, shown in solid lines) and the same lobe 80L under quasi-static loading (274, shown in dashed lines). The unloaded lobe 270 is cut at the first end 84 and the thickness T1 of the lobe 80 can be seen. The first end 84 of the unloaded lobe 270 is positioned an unloaded height H5 above the second end 88. When the lobe 80L is under quasi-static or static loading 274, the lobe 80L has a slightly different shape and the first end 84 is displaced downwardly a distance L2. Thus, the first end 84 of the loaded lobe 274 is positioned a loaded height H6 above the second end 88. The second end 88 does not move in the example shown in FIG. 13. The first end 84's displacement amount L2 is measured by subtracting the height H6 of the first end 84 of the lobe 80L after the load is applied 274 from the height H5 of the first end 84 of the lobe 80L before the load is applied 270, i.e., L2=H5−H6. The upper platform 8 of the isolator 4 is interconnected to the first end 84 of the lobe 80L; therefore, the displacement L2 of the first end 84 of the lobe 80L is the relevant point of reference because the portion of the upper platform 8 proximate the lobe's first end 84 will displace the same amount as the first end 84 of the lobe 80L. As such, it is desired that the first end 84 of each lobe 80 will displace the same amount when under the same quasi-static loading, which will cause the upper platform 8 to displace a uniform amount.

Therefore, if FIGS. 12 and 13 where under the same quasi-static loading, then the displacement L2 of the first end 84 of the lobe 80K of FIG. 12 would equal the displacement L2 of the first end 84 of the lobe 80L of FIG. 13. Moreover, static deformation of the isolator 4 can be maintained by making each differently-shaped lobe 80 statically equivalent to the other lobes 80 when under a given quasi-static loading. Further, uniform motion under quasi-static loading enables the maximum amount of travel of the upper platform 8 and the component without the upper platform 8 bottoming out (i.e., hitting the structure or lower platform 12). If only one lobe 80 is displaced, then only a portion (or one side) of the upper platform 8 would be displaced, which could cause the component to tilt or cause that portion of the upper platform 8 to bottom out on the lower platform 12. Embodiments of the present invention are designed to reduce bottoming-out because bottoming-out can increase the vibration and shock experienced by the component.

In some embodiments, the lobes are solid. In other embodiments, the lobes are hollow. In still other embodiments, some lobes are hollow while some lobes are solid. The lobes may be the same density or the lobes may be different densities. Alternatively, some lobes may be the same density while other lobes are other densities.

Figure 14:
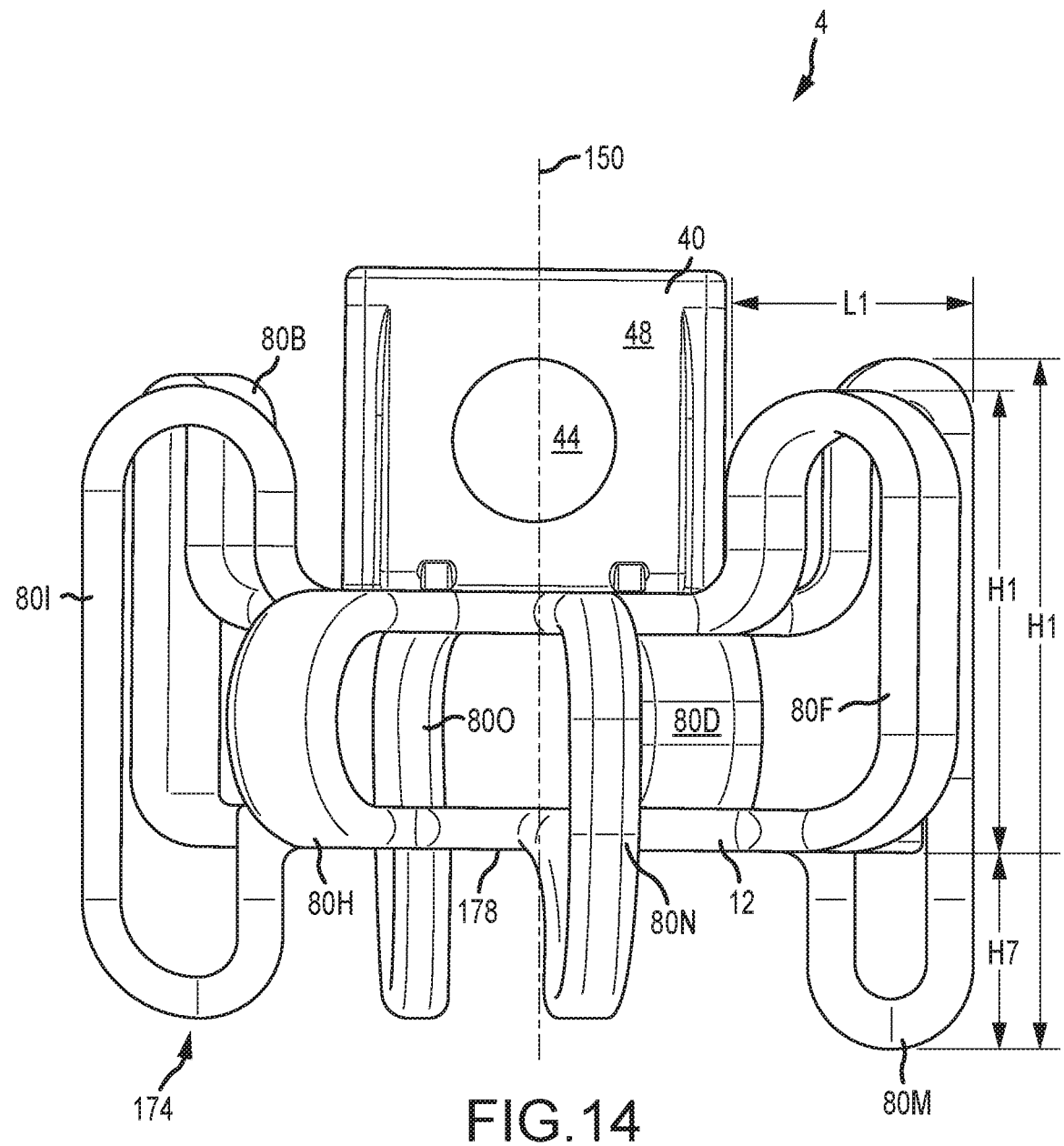
FIG. 14 is a front elevation view of an isolator.

FIG. 14 shows an isolator 4 according to one embodiment of the present disclosure. The isolator 4 has an upper platform 8, a lower platform 12, and multiple lobes (collectively 80, individually 80B, 800, 80D, 80M, 80F, 80N, 80H, 80I). In the embodiment shown, each lobe has a different shape and/or size. Further, some lobes 801, 800, 80M, 80N extend below the lower platform 12 a distance H7.

FIG. 15A is a side elevation view of an isolator 304 for a large item, e.g., a 30- to 100-pound flight box, a seat with a passenger, a satellite, or any other large item weighing hundreds or even thousands of pounds. The isolator 304 may have hundreds of lobes 380 including internal lobes 380B, 380C, 380D and lobes 380A around the perimeter. As discussed herein, the shape of the lobes 380 may vary. The isolator 304 has an upper platform 308 and a lower platform 312. The upper platform 308 has an upper surface 316 and a lower surface 318. The lower platform 312 has an upper surface 320 and a lower surface 322. The platforms 308, 312 are spaced a height H4 apart from one another. Each platform 308, 312 has a perimeter edge or outer perimeter 328, 356, respectively. The lower platform 312 may be interconnected to the flight vehicle or other structure on the vehicle. The isolated component is interconnected to the upper surface 316 of the upper platform 308.

The lobes 380 can be any shape, size, density, and weight. For example, some lobes 380A have a first end integrally extending from the outer perimeter 328 of the upper platform 308 and a second end integrally extending from the outer perimeter 356 of the lower platform 312. The lobe 380A extends outwardly from the first end and outwardly from the second end. Additionally, the isolator 304 may have internal lobes 380B, 380C, 380D of varying shapes. In one embodiment, some lobes 380B, 380C extend downwardly from the lower surface 318 of the upper platform 308, extend outwardly into an earlobe shape having a lobe height H1, and then extend downwardly to the upper surface 320 of the lower platform 312. The lobes 380B, 380C may be positioned proximate one another such that they mirror one another and are spaced a length L3 apart from one another.

The internal lobes 380 may also be a "C" or donut shape as shown by lobe 380D. The C-shaped lobes could be shorter and thicker than the earlobe-shaped lobes 380B, 380C, which would increase the center of gravity and the geometric center of the isolated component less than taller earlobe-shaped lobes 380B, 380C. The taller the internal lobes and the taller the height H4, the more the center of gravity and the geometric center of the isolated component is increased.

The internal lobes 380B, 380C, 380D can be arranged in a random pattern or can be arranged in a predetermined pattern between the platforms 308, 312. For example, the lobes 380B, 380C, 380D may be arranged in a "circular" pattern consisting of multiple four-lobe clusters. Each four-lobe cluster comprises four lobes positioned 90 degrees apart from one another to form an "X" or cross-like shape. Then the neighboring four-lobe cluster is the same shape, except that the entire cluster is rotated 45 degrees relative to the first four-lobe cluster. This pattern can repeat as many times as needed depending on the number of lobes needed. The circular shape could have more lobes, for example, five, six, seven, eight, or any number of lobes. Additionally, the lobes 380B, 380C, 380D may be the same shape or different shapes and may be the same weight and/or density or different weights and/or densities in various embodiments.

FIG. 15B is a cross-sectional view of an isolator 304 for a large item, e.g., a 30- to 100-pound flight box, a seat with a passenger, a satellite, or any other large item weighing hundreds or even thousands of pounds. The isolator 304 has an endoskeleton structure 402, which is a strong structural material, such as metal or ABS plastic, and is used to enhance the load carrying capability of the isolator. The endoskeleton structure 402 is surrounded by a damping material 400. The endoskeleton structure 402 can be thicker or thinner than is shown in FIG. 15B. The endoskeleton structure 402 can be comprised of any known strong material. Further, some lobes 380 may have the endoskeleton structure 402 while other lobes may not have the endoskeleton structure 402.

The embodiment shown in FIG. 15A may or may not have an endoskeleton structure; it depends on the load the isolator must support. For heavier loads, the isolator 304 will have an endoskeleton structure, while for lighter loads the endoskeleton structure is not necessary. Thus, some embodiments may have the endoskeleton structure 402, while other embodiments do not have the endoskeleton structure 402. Moreover, any of the other embodiments shown in FIGS. 1-14 may or may not have an endoskeleton structure.

The embodiment of the isolator 304 with the endoskeleton structure 402 can be produced in several ways. For one, the damping material 400 can be 3D printed to make a skeletal "glove" that covers at least the significant dynamic absorption features of the endoskeleton structure 402 such as the lobes 380. Slits in the damping "glove" allow it to be fit over the endoskeleton. Alternatively, the entire isolator 304 can be printed using a 3D printer that can print multiple materials, including metal and the damping material. Thus, the endoskeleton structure 402 with the damping material 400 is 3D printed simultaneously. Additionally, a 3D printed metal that uses a powder bed could be used. Here, the endoskeleton structure 402 may trap the raw metal powder in the 3D printed endoskeleton structure 402. The metal powder would attenuate shock and vibration loading because the metal powder absorbs high frequency waves.

Both the endoskeleton structure 402 and the damping material 400 can be either homogeneous or non-homogeneous in material, size, and dimensionally. Thus, the endoskeleton structure 402 may be thicker or wider in some areas or may be a consistent shape and size throughout. Further, the endoskeleton structure 402 may be different materials at different locations, for example one lobe may have a first material for the endoskeleton structure 402 and a second lobe may have a second material for the endoskeleton structure 402 and the platform may have a third material for the endoskeleton structure 402. The same is true for the damping material 400: one lobe may have one damping material, a second lobe may have a second damping material, etc. The damping material 400 may also be different thicknesses or shapes at different locations throughout the isolator 304.

Figure 16:
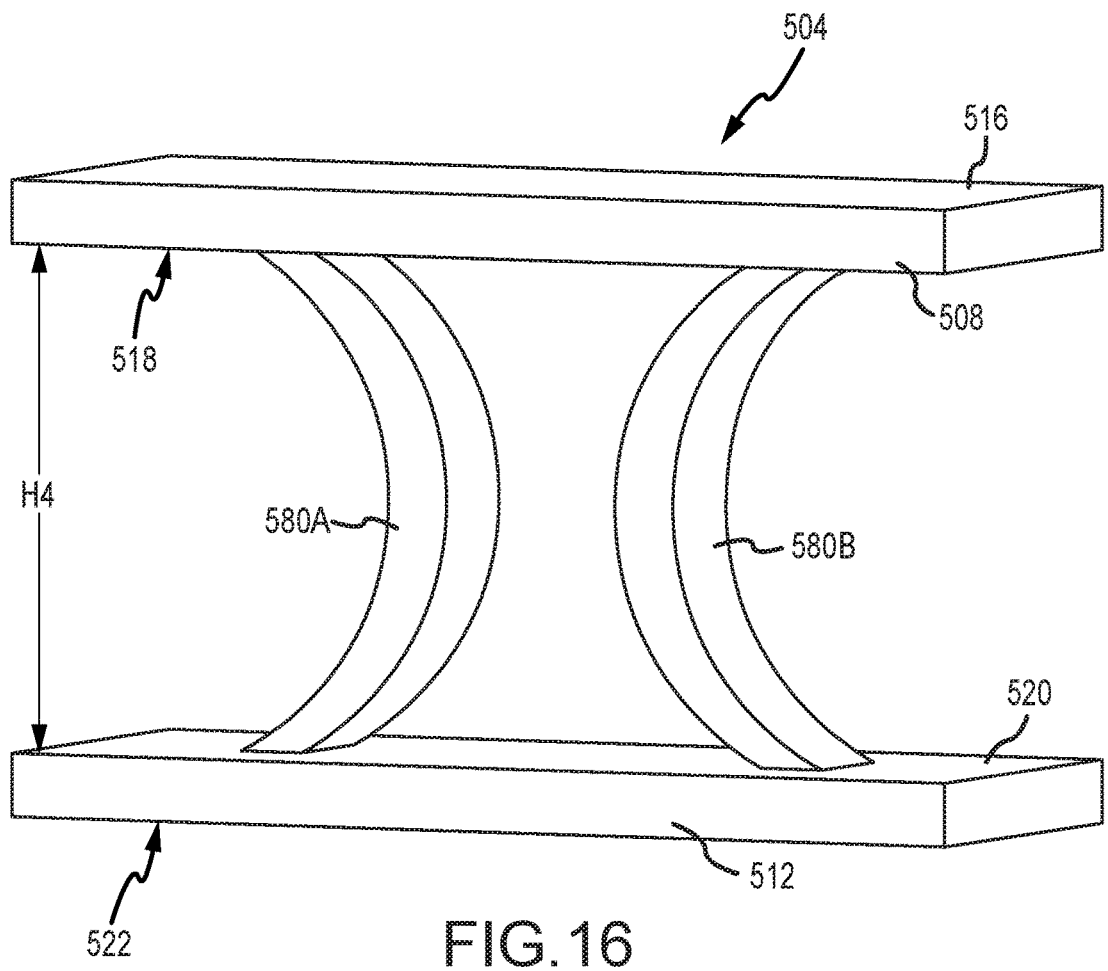
FIG. 16 is a perspective view of a portion of an isolator in its static state.

FIG. 16 is a perspective view of a portion of an isolator 504 in its static state. The portion of the isolator 504 shown has an upper platform 508 positioned opposite a lower platform 512. The upper platform 508 has an upper surface 516 and a lower surface. The lower platform 512 has an upper surface 520 and a lower surface. When the isolator 504 is in its static state (i.e., not experiencing vibrations, heat, or other conditions), the lower surface of the upper platform 508 is positioned a height H4 above the upper surface 520 of the lower platform 512. The isolator has lobes 580A, 580B positioned like columns between the platforms 508, 512. Each lobe 580A, 580B extends from the lower surface of the upper platform 508 to the upper surface 520 of the lower platform 512. The lobes 580A, 580B are shown with a curved shape and rectangular cross-section, but the lobes 580A, 580B could have any shape and any cross-section shape that isolates the component and contacts another lobe when quasi-static plus dynamic loading is sufficient. When the isolator 504 is in its static state, the lobes 580A, 580B do not touch one another. The isolator 504 can have more lobes and different types of lobes than those shown in FIG. 16. For example, the isolator 504 can have external lobes 80, 380A or differently shaped internal lobes 380B, 380D, and any combination thereof, exemplary embodiments of which are shown in FIGS. 1-15B and 18.

Figure 17:
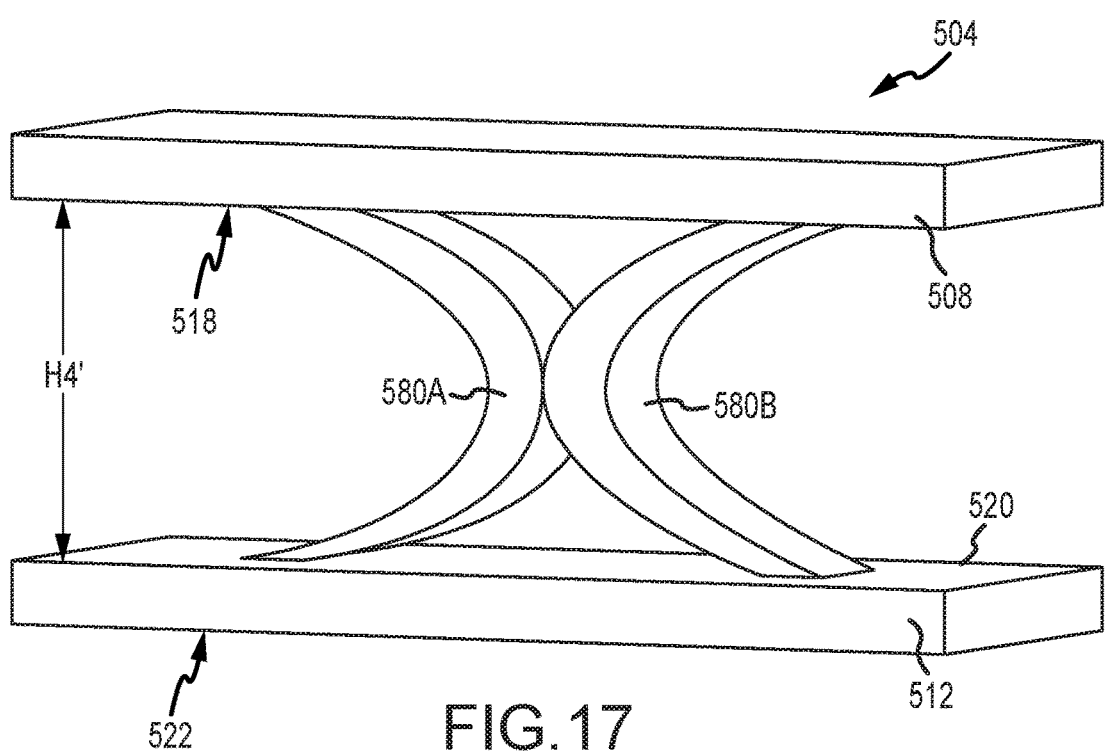
FIG. 17 is a perspective view of the portion of the isolator of FIG. 16 damping vibrations at the point where the lobes interfere with one another.
Figure 20:
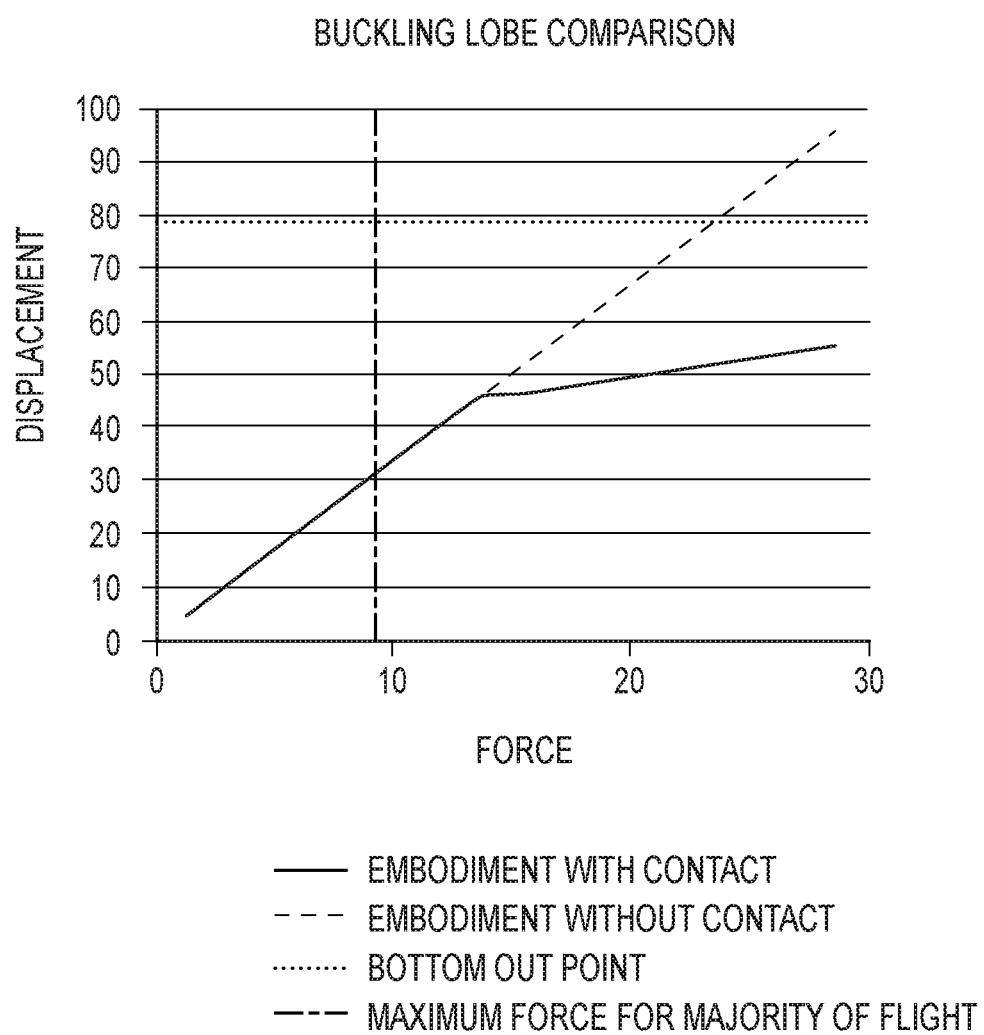
FIG. 20 is a buckling lobe comparison graph.

FIG. 17 is a perspective view of the portion of the isolator 504 of FIG. 16 damping vibrations at the point where the lobes contact or interfere with one another. As the isolator 504 dampens the vibrations, the two platforms 508, 512 move closer to one another such that the height H4' between the lower surface of the upper platform 508 and the upper surface 520 of the lower platform 512 is less than the height H4 shown in FIG. 16 when the isolator 504 is in its static state. The isolator platform 508 displaces an amount equal to H4−H4', assuming the component is attached to the upper platform 508 and the lower platform 512 is secured to a structure. In some embodiments, the upper platform 508 will displace a uniform amount under various loads. For example, in the heavy-load-carrying embodiment, the endoskeleton structure could be very stiff to prevent or limit locally deformation. However, in other embodiments, the upper platform 508 may not uniformly displace. As the platforms 508, 512 move closer to one another, a portion of the first lobe 580A engages a portion of the second lobe 580B. The lobes 580A, 580B are positioned and designed such that they will engage each other when sufficient quasi-static plus dynamic loading occurs. This engagement causes the lobes 580A, 580B to interfere with one another, which changes the performance of the lobes. The change in lobe performance is shown in the graph of FIG. 20 and is described in the description therewith. The lobes 580A, 580B are designed and positioned such that they interfere with one another at the point when the isolator 504 would otherwise experience overload and likely bottom out due to excessive displacement. By the lobes 580A, 580B interfering with one another, the interference prevents the isolator 504 from bottoming out because the interference limits the displacement. Thus, the isolator 504 continues to perform well by isolating the component even after the point when typical isolators would be overloaded and no longer be able to isolate the component. At the point where the lobes contact one another, there would be a contact event. However, there is little ability to impart much shock because the lobes are comprised of elastomeric materials and elastomeric materials are poor shock transmitters. Further, the lobes are designed to operate without contact during at least about 95% of the flight. Only in the unlikely 5% of the time will the lobes contact one another.

Figure 18:
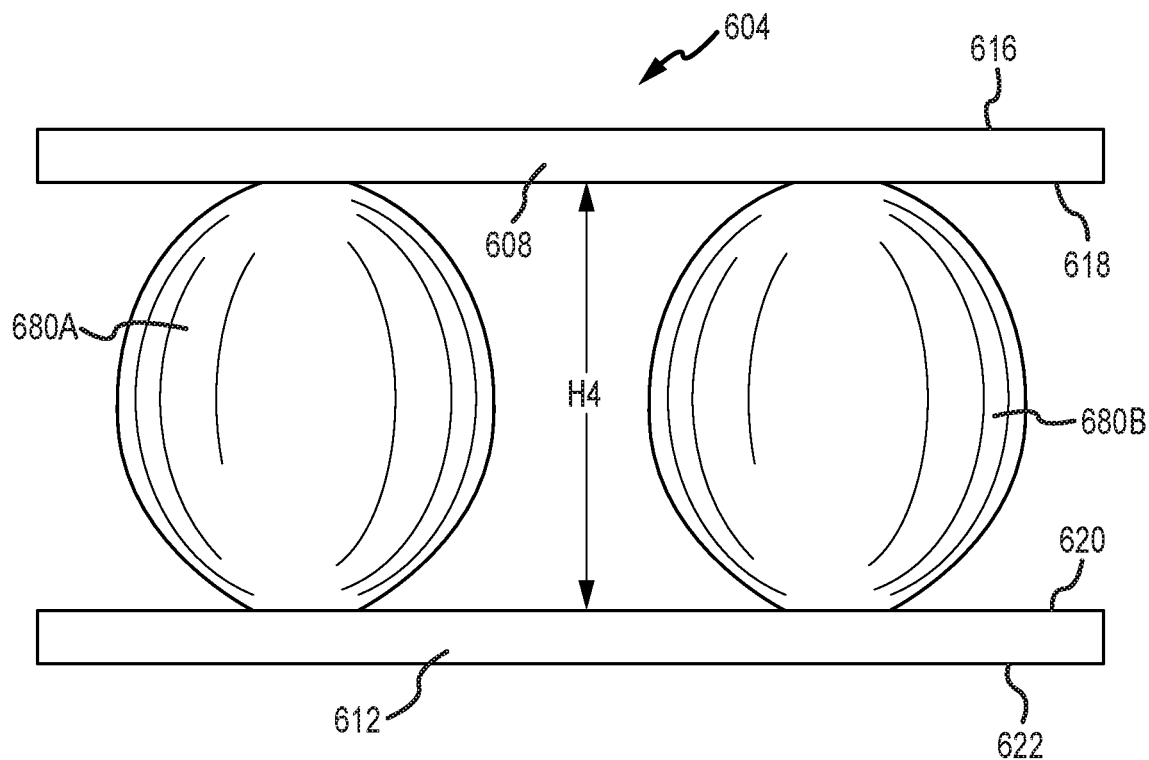
FIG. 18 is a front elevation view of a portion of an isolator in its static state.

FIG. 18 is a front elevation view of a portion of an isolator 604 in its static state. The portion of the isolator 604 shown has an upper platform 608 positioned opposite a lower platform 612. The upper platform 608 has an upper surface 616 and a lower surface 618. The lower platform 612 has an upper surface 620 and a lower surface 622. When the isolator 604 is in its static state (i.e., not experiencing vibrations, heat, or other conditions), the lower surface 618 of the upper platform 608 is positioned a height H4 above the upper surface 620 of the lower platform 612. The isolator has lobes 680A, 680B positioned between the platforms 608, 612. Each lobe 680A, 680B extends from the lower surface 618 of the upper platform 608 to the upper surface 620 of the lower platform 612. The lobes 680A, 680B shown have a spherical or egg-like shape and circular cross-section, but the lobes 680A, 680B could have any shape and any cross-section shape that isolates the component and permits contact with another lobe when sufficient total load (quasi-static plus dynamic loading) occurs. The lobes 680A, 680B may be solid or hollow depending on the needs of the isolator 604 and the mass of the component to isolate. When the isolator 604 is in its static state, the lobes 680A, 680B do not touch one another. The isolator 604 can have more lobes and different types of lobes than those shown in FIG. 18. For example, the isolator 604 can have external lobes 80, 380A or differently shaped internal lobes 380B, 380D, 580A, 580B, and any combination thereof.

Figure 19:
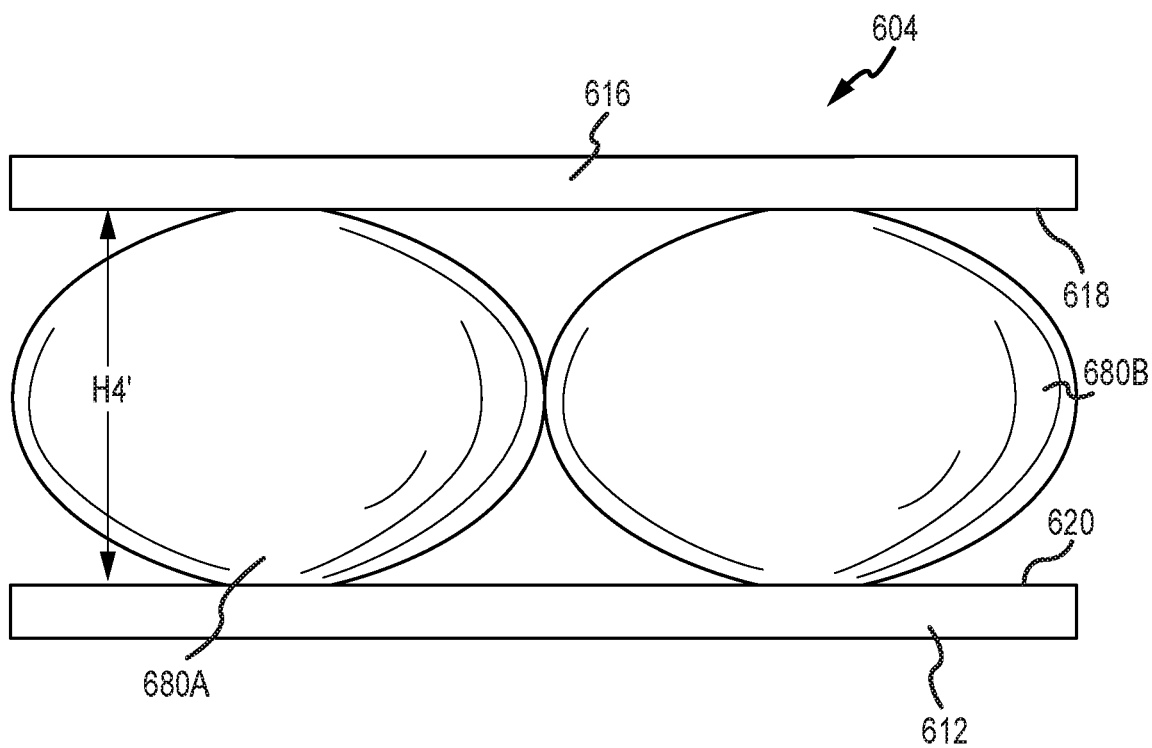
FIG. 19 is a front elevation view of the portion of the isolator of FIG. 18 damping vibrations at the point where the lobes interfere with one another.

FIG. 19 is a front elevation view of the portion of the isolator 604 of FIG. 18 damping vibrations at the point where the lobes contact or interfere with one another. As the isolator 604 dampens the vibrations, the two platforms 608, 612 move closer to one another such that the height H4' between the lower surface 618 of the upper platform 608 and the upper surface 620 of the lower platform 612 is less than the height H4 shown in FIG. 18 when the isolator 604 is in its static state. The isolator platform 608 displaces an amount equal to H4−H4', assuming the component is attached to the upper platform 608 and the lower platform 612 is secured to a structure. As the platforms 608, 612 move closer to one another, a portion of the first lobe 680A engages a portion of the second lobe 680B. The lobes 680A, 680B are positioned and designed such that they will engage each other at their modes. This engagement causes the lobes 680A, 680B to interfere with one another, which changes the performance of the lobes. The change in lobe performance is shown in the graph of FIG. 20. The lobes 680A, 680B are designed and positioned such that they interfere with one another at the point when the isolator 604 would otherwise experience overload and likely bottom out due to excessive displacement. By the lobes 680A, 680B interfering with one another, the interference prevents the isolator 604 from bottoming out because the interference limits the displacement. Thus, the isolator 604 continues to perform well by isolating the component even after the point when typical isolators would be overloaded and no longer be able to isolate the component.

An advantage of using a lobe 680A, 680B with a shape similar to those shown in FIG. 18 over a lobe 580A, 580B with a shape similar to those shown in FIG. 16 is that the lobes 580A, 580B shown in FIG. 16 may slip off of one another when the isolator experiences extreme conditions and is operating under overload conditions. Thus, the lobes 580A, 580B may only contact one another and interfere with one another for a short time. However, the lobes 680A, 680B of FIG. 18 slip less because there is more area to contact one another when under overload conditions. Therefore, the lobes 680A, 680B remain in contact with one another throughout the overload period.

Moreover, any of the isolators 4, 304, 504, 604 described herein can have a combination of different types of lobes, including any of the lobes shown in FIGS. 1-19. And the isolators can have any number of lobes from two lobes to hundreds or thousands of lobes. Moreover, the lobes can have any shape shown or described herein, including a sphere, an egg, a C-shape, a U-shape, a C-shaped column, and an ear.

FIG. 20 is a buckling lobe comparison graph that shows the amount the isolator displaces depending on the amount of force experienced by the isolator. The lower portion of the solid line represents the displacement experienced by an isolator with lobes that are spaced apart such that they do not contact one another and an isolator with lobes that contact one another once the isolator experiences a certain amount of force. At this point on the graph, the two isolators behave the same. Additionally, a vertical line on the graph shows the maximum force experienced by the component for the majority of the flight. Thus, the standard design level would be for forces less than the vertical line. A horizontal line shows the isolator's bottoming out point. Above this line, the isolator experiences overload conditions. In overload conditions, the lobes will not be working as tuned mass dampers because the lobes will be squished between the platforms.

An isolator designed at the standard design level would cover the majority of the conditions the component and isolator experience during flight. However, the standard design level would not isolate the component from large shock events experienced during stage I/II separation, fairing separation, and space vehicle separation. These separation events cause forces to the right of the vertical line and displacements greater than the horizontal line, which means an isolator designed at the standard design level would bottom out during these events. In order to prevent the isolator from bottoming out during the separation events, either the isolator must be overdesigned to accommodate these conditions or the isolator must have a non-linear design, as is shown by the bend in the solid line and the upper portion of the solid line. Regarding the term "non-linear design," the isolator with the contacting lobes has a "non-linear" design because the displacement graph has a non-linear shape.

The sloped line splits into two lines: a dashed line and a solid line. The two sloped lines above the split in the graph represent the different performance of the two designs. The split point in the graph is the point where the interfering lobes begin contacting one another. Here, the dashed line continues on the same linear trajectory as the lower solid line. The dashed line represents an isolator with lobes that do not contact one another and, therefore, do not interfere with one another. The dashed line intersects the horizontal bottoming out line. At this point, there is too much displacement for the isolator represented by the dashed line and this isolator will bottom out. The solid line above the split represents an isolator with lobes that interfere with one another to prolong bottoming out and reaching overload conditions, e.g., an isolator with lobes similar to those shown in FIGS. 16-19. Because the lobes interfere with one another, the isolator experiences less displacement when under large amounts of force. Accordingly, a lot more force is required to make the isolator with interfering lobes bottom out. Additionally, the dashed line (non-interfering lobe isolator) reaches bottoming out conditions much quicker than the solid line (interfering lobe isolator). Thus, isolators with lobes that interfere with one another give the designer the ability to tailor performance with overload protection due to the non-linear design.

Further, using interfering lobes permits the designer to use softer damping materials for the isolator and lobes and still meet the P99/90 statistical confidence requirements. In prior art isolators, designers had to use excessive durometer stiffening (i.e., very hard damping materials) to meet the P99/90 statistical confidence requirements.

Because the lobes or groups of lobes designed to isolate a given frequency need to have an effective modal mass that is at least 10% of the mass of the isolated component, the lobes may need to be very heavy. Therefore, in some embodiments, the lobes will include weights or heavy inserts (e.g., lead, other metal, or heavy plastic) to increase the mass of the lobes.

The embodiments shown herein are scalable, meaning they can be constructed in a small size for small and/or lightweight components or they can be constructed in a large size (with or without an endoskeleton structure) for large and/or heavy components.

Further, even though components are not shown on the isolators in the figures, the isolators of the present invention are specifically designed to support a component on top of the isolator. Typically, the component sits on the isolator's upper platform 16, 316.

Isolators according to embodiments of the present invention can be manufactured of various materials. For example, in one embodiment, the isolator is an elastomeric material. Elastomeric materials provide more dissipation of energy than other materials. Elastomeric materials also have a greater potential for damping due to the material friction and they use internal friction to absorb vibrations. In another embodiment, the isolator is a UV-cured polymer material. In a further embodiment, the UV-cured polymer material isolator has a silicone coating to reduce or eliminate outgassing. The silicone coating seals in gases and can be white to absorb less radiation and heat in space.

Embodiments of the present invention do not require a dumb mass, which prior art isolators required. Dumb masses add extra weight and are undesirable for situations such as space flight where extra weight is expensive and unwanted. Prior art isolators used the dumb mass to attenuate the load experienced by the component and isolator. Typically, the dumb mass must have a mass that is equal to about 10% of the mass of the component being isolated. The present invention removes the need for the dumb mass because the isolator and lobes are the dumb mass and, therefore, the isolator and/or lobes use their own mass to attenuate the load experienced by the isolator and component. In some embodiments where the lobes have the same shape, weight, density, and/or effective modal mass, the entire isolator (with the lobes) has a mass that is about 10% of the mass of the component. Alternatively, where each lobe has a different shape, weight, density, and/or effective modal mass, each lobe can have a mass that is about 10% of the mass of the component such that each lobe alone could attenuate a specific frequency or mode. In further embodiments, some lobes may have the same shape, weight, density, and/or effective modal mass such that these lobes together have a mass that is about 10% of the mass of the isolated component. Thus, embodiments of the present invention do not need an additional dumb mass and all of the mass of the isolator is used as a dynamic absorber rather than just being a dumb mass. Further, by making the isolator an elastomeric material, the elastomeric material dampens and dissipates energy.

Embodiments of the present invention can be manufactured using additive manufacturing (i.e., 3D printing) technology. As such, isolators of the present invention only have about a six-hour lead time, are easy to manufacture, and are inexpensive to manufacture.

Embodiments of the present invention can isolate the component from electrical current and static charge, shock, vibration, thermal loads because the material's elastomeric properties that generate friction tend to isolate static charge, shock, vibration, and thermal loads as well.

Additionally, various features/components of one embodiment may be combined with features/components of another embodiment. For example, features/components of one figure can be combined with features/components of another figure or features/components of multiple figures. To avoid repetition, every different combination of features has not been described herein, but the different combinations are within the scope of this disclosure. Additionally, if details (including angles, dimensions, etc.) about a feature or component are described with one embodiment or one figure, then those details can apply to similar features of components in other embodiments or other figures.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

What is claimed is:

1. An isolator, comprising:
a first platform having an outer surface, a planar inner surface, and a perimeter extending between the outer and inner surfaces;
a second platform having an outer surface, a planar inner surface, and a perimeter extending between the outer and inner surfaces, the second platform spaced from the first platform with the planar inner surface of the second platform facing the planar inner surface of the first platform;
a first lobe having a first end directly interconnected to the planar inner surface of the first platform and a second end directly interconnected to the planar inner surface of the second platform, wherein the first end of the first lobe connects perpendicularly to the planar inner surface of the first platform, and wherein the first lobe is spaced inwardly from the perimeter of the first platform and the perimeter of the second platform such that the first lobe does not extend beyond the perimeter of the first platform and the perimeter of the second platform;
a second lobe having a first end directly interconnected to the planar inner surface of the first platform and a second end directly interconnected to the planar inner surface of the second platform, and wherein the second lobe is spaced inwardly from the perimeter of the first platform and the perimeter of the second platform such that the second lobe does not extend beyond the perimeter of the first platform and the perimeter of the second platform;
wherein the first and second lobes are comprised at least partially of a damping material; and
wherein when a force is applied to the first or second platform and the first lobe is deformed the first lobe does not extend beyond the perimeter of the first platform and the perimeter of the second platform, and when a force is applied to the first or second platform and the second lobe is deformed the second lobe does not extend beyond the perimeter of the first platform and the perimeter of the second platform.

2. The isolator of claim 1, wherein the first and second lobes displace an equal amount when experiencing an equal force.

3. The isolator of claim 1, further comprising a third lobe having a first end and a second end, the first end interconnected to the perimeter of the first platform, the second end interconnected to the perimeter of the second platform, and wherein the third lobe extends radially beyond the perimeter of the first platform and the perimeter of the second platform.

4. The isolator of claim 1, wherein the first lobe has a first shape selected from the group consisting of a semicircle, a sphere, an egg having a non-uniform radius of curvature, and a shape with one or more linear portions and one or more curved portions, and wherein the second lobe has a second shape selected from the group consisting of a semicircle, a sphere, an egg having a non-uniform radius of curvature, and a shape with one or more linear portions and one or more curved portions.

5. The isolator of claim 1, wherein the first lobe is a mirror image of the second lobe.

6. The isolator of claim 1, wherein the first lobe forms a closed loop.

7. The isolator of claim 1, wherein the first lobe and the second lobe together form a closed loop with a portion of the first platform and a portion of the second platform.

8. The isolator of claim 1, where the first and second lobes deform in a direction toward each other when the first and second lobes are subject to loading.

9. The isolator of claim 1, wherein the first and second lobes deform in a direction away from each other when the first and second lobes are subject to loading.

10. The isolator of claim 1, further comprising a centerline extending substantially perpendicular to a plane of the first and second platforms, wherein the first lobe is completely positioned on one side of the centerline and the second lobe is completely positioned on another side of the centerline, and wherein when the isolator experiences sufficient loading the first lobe and the second lobe are displaced in a direction substantially parallel to the plane of the first and second platforms.

11. The isolator of claim 1, wherein when the isolator experiences sufficient loading a portion of the first lobe contacts a portion of the second lobe.

12. The isolator of claim 1, wherein the first lobe and the second lobe have different shapes.

13. The isolator of claim 1, wherein the first platform, the second platform, the first lobe, and the second lobe are a single homogeneous structure.

14. An isolator, comprising:
a first platform having an outer surface, an inner surface, and a perimeter extending between the outer and inner surfaces;

a second platform having an outer surface, an inner surface, and a perimeter extending between the outer and inner surfaces, the second platform spaced from the first platform with the inner surface of the second platform facing the inner surface of the first platform;

a centerline extending substantially perpendicular to a plane of the first and second platforms;

a first lobe having a first end interconnected to the inner surface of the first platform and a second end interconnected to the inner surface of the second platform, the first lobe positioned on one side of the centerline and spaced inwardly from the perimeter of the first platform, wherein the first lobe comprises:

- a first linear portion interconnected to the first end and extending substantially perpendicularly from the inner surface of the first platform;
- a second linear portion interconnected to the first linear portion and extending substantially perpendicular thereto;
- a U-shaped portion interconnected to the second linear portion;
- a third linear portion interconnected to the U-shaped portion and oriented substantially parallel to the second linear portion; and
- a fourth linear portion interconnected to the second end and extending substantially perpendicularly from the inner surface of the second platform;

a second lobe having a first end interconnected to the inner surface of the first platform and a second end interconnected to the inner surface of the second platform, the second lobe positioned on another side of the centerline and spaced inwardly from the perimeter of the first platform;

wherein the first and second lobes are comprised at least partially of a damping material; and wherein when the isolator experiences sufficient loading the first lobe and the second lobe are displaced in a direction substantially parallel to the plane of the first and second platforms.

15. The isolator of claim 14, further comprising a third lobe having a first end and a second end, the first end interconnected to the perimeter of the first platform, the second end interconnected to the perimeter of the second platform, and wherein the third lobe extends radially beyond the perimeter of the first platform and the perimeter of the second platform.

16. The isolator of claim 14, wherein the second lobe has a shape selected from the group consisting of a semicircle, a sphere, an egg having a non-uniform radius of curvature, and a shape with one or more linear portions and one or more curved portions.

17. The isolator of claim 14, wherein the first lobe and the second lobe have different shapes.

18. The isolator of claim 14, wherein when the isolator experiences sufficient loading a portion of the first lobe contacts a portion of the second lobe.

19. The isolator of claim 14, wherein the first platform, second platform, the first lobe, and the second lobe are a single homogeneous structure.

20. The isolator of claim 14, wherein the first and second lobes displace an equal amount when experiencing an equal force.

* * * * *